United States Patent
Elshafie et al.

(10) Patent No.: US 12,278,496 B2
(45) Date of Patent: Apr. 15, 2025

(54) MANAGEMENT OF TRANSMISSION INSTANCES FOR ENERGY HARVESTING DEVICES

(71) Applicant: QUALCOMM Incorporated, San Diego, CA (US)

(72) Inventors: Ahmed Elshafie, San Diego, CA (US); Abdelrahman Mohamed Ahmed Mohamed Ibrahim, San Diego, CA (US); Ahmed Attia Abotabl, San Diego, CA (US); Muhammad Sayed Khairy Abdelghaffar, San Jose, CA (US); Linhai He, San Diego, CA (US); Yuchul Kim, San Diego, CA (US); Hwan Joon Kwon, San Diego, CA (US); Krishna Kiran Mukkavilli, San Diego, CA (US); Peter Gaal, San Diego, CA (US); Tingfang Ji, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/836,895

(22) Filed: Jun. 9, 2022

(65) Prior Publication Data

US 2023/0413066 A1    Dec. 21, 2023

(51) Int. Cl.
*H02J 50/00* (2016.01)
*H02J 50/80* (2016.01)
(Continued)

(52) U.S. Cl.
CPC ............ *H02J 50/001* (2020.01); *H02J 50/80* (2016.02); *H04B 7/028* (2013.01); *H04B 7/0408* (2013.01);
(Continued)

(58) Field of Classification Search
CPC .......... H02J 50/00–90; H04B 7/02–12; H04B 17/0082–409; H04L 1/02–08;
(Continued)

(56) References Cited

U.S. PATENT DOCUMENTS

| | | | |
|---|---|---|---|
| 2015/0303741 A1* | 10/2015 | Malik | H02J 50/001 |
| 2020/0228263 A1 | 7/2020 | Khoshnevisan et al. | |
| 2022/0248432 A1* | 8/2022 | Balasubramanian | H02J 50/001 |

FOREIGN PATENT DOCUMENTS

WO    WO-2023123187 A1    7/2023

OTHER PUBLICATIONS

Hu J., et al., "Dynamic Energy-efficient Resource Allocation in Wireless Powered Communication Network", Wireless Networks, Acm, 2 Penn Plaza, Suite 701—New York, USA, vol. 25, No. 6, May 24, 2018, pp. 1-14, XP036802211, abstract.
(Continued)

*Primary Examiner* — Timothy J Weidner
(74) *Attorney, Agent, or Firm* — Paul M. McAdams; Holland & Hart LLP

(57) ABSTRACT

Methods, systems, and devices for wireless communications are described. For a set of scheduled transmission instances of a data communication, a transmitting network node may determine a first spatial filter to apply for a first subset of the scheduled transmission instances configured to provide the data communication and a second spatial filter to apply for a second subset of the scheduled transmission instances configured to allow energy harvesting at an energy harvesting device. In some cases, the transmitting network node may indicate a first quasi co-location (QCL) relation to use for the first subset of the scheduled transmission instances configured to provide the data communication to the network node receiving the data transmissions, and the transmitting network node may indicate a second QCL relation to use for the second subset of the scheduled transmission
(Continued)

instances configured to allow energy harvesting to the energy harvesting device.

30 Claims, 23 Drawing Sheets

(51) Int. Cl.

| | |
|---|---|
| *H04B 7/02* | (2018.01) |
| *H04B 7/0408* | (2017.01) |
| *H04B 17/10* | (2015.01) |
| *H04B 17/20* | (2015.01) |
| *H04W 16/28* | (2009.01) |
| *H04W 24/10* | (2009.01) |
| *H04W 52/02* | (2009.01) |
| *H04W 72/044* | (2023.01) |
| *H04W 72/1263* | (2023.01) |
| *H04W 72/20* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ......... *H04B 17/102* (2015.01); *H04B 17/202* (2023.05); *H04W 16/28* (2013.01); *H04W 24/10* (2013.01); *H04W 52/02* (2013.01); *H04W 72/046* (2013.01); *H04W 72/1263* (2013.01); *H04W 72/20* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01); *Y02D 30/70* (2020.08)

(58) Field of Classification Search
CPC .... H04L 5/00–0098; H04W 16/02–32; H04W 24/02–10; H04W 52/02–60; H04W 72/02–569; H04W 84/005–22; H04W 88/005–188; H04W 92/02–24; Y02D 30/00–70

See application file for complete search history.

(56) References Cited

OTHER PUBLICATIONS

International Search Report and Written Opinion—PCT/US2023/024316—ISA/EPO—Nov. 28, 2023.

Ghafoor S., et al., "MAC Protocols for Terahertz Communication: A Comprehensive Survey", IEEE Communications Surveys & Tutorials, USA, vol. 22, No. 4, Aug. 18, 2020, pp. 2236-2282, XP011821378, abstract.

Partial International Search Report—PCT/US2023/024316—ISA/EPO—Sep. 8, 2023.

Telefonica: "Scaling for Mass Deployment Telefónica's Views on 3GPP Release 12", RWS-120008, 3rd Generation Partnership Project, Mobile Competence Centre, 650, Route Des Lucioles, F-06921 Sophia-Antipolis Cedex, France, Jun. 1, 2012, XP050655097, pp. 1-14, slide 11.

* cited by examiner

MANAGEMENT OF TRANSMISSION INSTANCES FOR ENERGY HARVESTING DEVICES

INTRODUCTION

The following relates to wireless communications, relating to management of transmission instances for energy harvesting devices. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support management of transmission instances for energy harvesting devices. For a set of scheduled transmission instances of a data communication, a transmitting network node may determine a first spatial filter to apply for a first subset of the scheduled transmission instances configured to provide the data communication and a second spatial filter to apply for a second subset of the scheduled transmission instances configured to allow energy harvesting at an energy harvesting device. Applying the second spatial filter enables the network node to direct the beam for the second subset of the scheduled transmission instances toward an antenna used for energy harvesting. In some cases, the energy harvesting device may be the transmitting network node itself. Accordingly, the transmitting device may self-recycle transmission energy for the second subset of transmission instances. In some cases, the energy harvesting device may be a different network node (e.g., a user equipment (UE) or an internet of things (IoT) device) from the transmitting network node (e.g., a UE in sidelink transmissions or a network entity in downlink transmissions). In some cases, for example, for downlink or sidelink transmissions, the transmitting network node may indicate a first quasi co-location (QCL) relationship to use for the first subset of the scheduled transmission instances configured to provide the data communication to the network node receiving the data transmissions, and the transmitting network node may indicate a second QCL relationship to use for the second subset of the scheduled transmission instances configured to allow energy harvesting to the energy harvesting device. Accordingly, the network nodes receiving the data transmissions and the energy harvesting device (which may be the same device) may configure respective receive beams to receive the transmitted data transmissions and energy harvesting transmissions.

A method for wireless communications at a first network node is described. The method may include determining a first spatial filter to apply to a first set of transmission instances of a set of multiple transmission instances of a data communication, where the first set of transmission instances is configured to provide the data communication to a second network node, determining a second spatial filter to apply to a second set of transmission instances of the set of multiple transmission instances, where the second set of transmission instances is configured to allow harvesting of energy from the data communication by a third network node, and transmitting the first set of transmission instances using the first spatial filter and the second set of transmission instances using the second spatial filter.

An apparatus for wireless communications at a first network node is described. The apparatus may include memory and at least one processor coupled to the memory. The at least one processor may be configured to determine a first spatial filter to apply to a first set of transmission instances of a set of multiple transmission instances of a data communication, where the first set of transmission instances is configured to provide the data communication to a second network node, determine a second spatial filter to apply to a second set of transmission instances of the set of multiple transmission instances, where the second set of transmission instances is configured to allow harvesting of energy from the data communication by a third network node, and transmit the first set of transmission instances using the first spatial filter and the second set of transmission instances using the second spatial filter.

Another apparatus for wireless communications at a first network node is described. The apparatus may include means for determining a first spatial filter to apply to a first set of transmission instances of a set of multiple transmission instances of a data communication, where the first set of transmission instances is configured to provide the data communication to a second network node, means for determining a second spatial filter to apply to a second set of transmission instances of the set of multiple transmission instances, where the second set of transmission instances is configured to allow harvesting of energy from the data communication by a third network node, and means for transmitting the first set of transmission instances using the first spatial filter and the second set of transmission instances using the second spatial filter.

A non-transitory computer-readable medium storing code for wireless communications at a first network node is described. The code may include instructions executable by a processor to determine a first spatial filter to apply to a first set of transmission instances of a set of multiple transmission instances of a data communication, where the first set of transmission instances is configured to provide the data communication to a second network node, determine a second spatial filter to apply to a second set of transmission instances of the set of multiple transmission instances, where the second set of transmission instances is configured to allow harvesting of energy from the data communication by a third network node, and transmit the first set of transmission instances using the first spatial filter and the second set of transmission instances using the second spatial filter.

Some examples of the method, apparatuses, and non-transitory computer-readable medium described herein may further include operations, features, means, or instructions for receiving scheduling information that configures the first network node to receive the set of multiple transmission instances.

Some examples of the method, apparatuses, and non-transitory computer-readable medium described herein may further include operations, features, means, or instructions for receiving control information indicative of a first transmission configuration indicator (TCI) state associated with the first set of transmission instances and a second TCI state associated with the second set of transmission instances, where determining the first spatial filter may be based on the first TCI state, and where determining the second spatial filter may be based on the second TCI state.

Some examples of the method, apparatuses, and non-transitory computer-readable medium described herein may further include operations, features, means, or instructions for transmitting second control information indicative of a QCL relationship for energy harvesting at the first network node, where the second TCI state may be based on the second control information.

Some examples of the method, apparatuses, and non-transitory computer-readable medium described herein may further include operations, features, means, or instructions for receiving one or more reference signals from the second network node and identifying the QCL relationship for harvesting of energy at the first network node based on measurement information corresponding to the one or more reference signals, where the third network node may be the first network node.

In some examples of the method, apparatuses, and non-transitory computer-readable medium described herein, the measurement information includes charging rate information for harvesting of energy associated with the one or more reference signals.

Some examples of the method, apparatuses, and non-transitory computer-readable medium described herein may further include operations, features, means, or instructions for receiving one or more reference signals from the second network node and transmitting second control information to the second network node indicating measurement information for the one or more reference signals, where the second TCI state may be based on the measurement information.

In some examples of the method, apparatuses, and non-transitory computer-readable medium described herein, the measurement information includes, for the one or more reference signals, at least one of a signal to interference and noise ratio, a reference signal received power, a reference signal received quality, or charging rate information that pertains to harvesting of energy.

In some examples of the method, apparatuses, and non-transitory computer-readable medium described herein, the charging rate information that pertains to harvesting of energy includes a one bit or multi-bit indicator of charging rate sufficiency based on one or more thresholds.

In some examples of the method, apparatuses, and non-transitory computer-readable medium described herein, the set of multiple transmission instances include a set of multiple uplink transmission repetitions.

Some examples of the method, apparatuses, and non-transitory computer-readable medium described herein may further include operations, features, means, or instructions for receiving control information indicative of a first transmission and reception point (TRP) associated with the first set of transmission instances and a second TRP associated with the second set of transmission instances, where determining the first spatial filter may be based on the first TRP being associated with the first set of transmission instances, and where determining the second spatial filter may be based on the second TRP being associated with the second set of transmission instances.

In some examples of the method, apparatuses, and non-transitory computer-readable medium described herein, the second set of transmission instances includes a different number of transmission instances than the first set of transmission instances.

Some examples of the method, apparatuses, and non-transitory computer-readable medium described herein may further include operations, features, means, or instructions for receiving one or more first reference signals from the first TRP, receiving one or more second reference signals from the second TRP, and transmitting second control information to the second network node indicating measurement information for the one or more first reference signals and the one or more second reference signals, where the control information may be based on the measurement information.

Some examples of the method, apparatuses, and non-transitory computer-readable medium described herein may further include operations, features, means, or instructions for transmitting, to the second network node, scheduling information that configures the second network node to receive the set of multiple transmission instances.

Some examples of the method, apparatuses, and non-transitory computer-readable medium described herein may further include operations, features, means, or instructions for transmitting control information indicative of a first TCI state associated with the first set of transmission instances and a second TCI state associated with the second set of transmission instances, where determining the first spatial filter may be based on the first TCI state, and where determining the second spatial filter may be based on the second TCI state.

Some examples of the method, apparatuses, and non-transitory computer-readable medium described herein may further include operations, features, means, or instructions for transmitting, to the second network node, one or more reference signals and receiving, from the second network node, measurement information for the one or more reference signals, where the second TCI state may be based on the measurement information.

In some examples of the method, apparatuses, and non-transitory computer-readable medium described herein, the set of multiple transmission instances may be a set of multiple sidelink transmission instances.

In some examples of the method, apparatuses, and non-transitory computer-readable medium described herein, the set of multiple transmission instances may be a set of multiple downlink transmission instances.

Some examples of the method, apparatuses, and non-transitory computer-readable medium described herein may further include operations, features, means, or instructions for transmitting the first set of transmission instances using a first power level and transmitting the second set of transmission instances using a second power level different than the first power level.

Some examples of the method, apparatuses, and non-transitory computer-readable medium described herein may further include operations, features, means, or instructions for transmitting, to the second network node, first control information indicative of a first QCL relationship associated with the first spatial filter and transmitting, to the third network node, second control information indicative of a second QCL relationship associated with the second spatial filter.

In some examples of the method, apparatuses, and non-transitory computer-readable medium described herein, harvesting energy from the second set of transmission instances, where the third network node may be the first network node.

A method for wireless communications at a first network node is described. The method may include determining a first QCL relationship to apply to a first set of reception instances of a set of multiple reception instances of a data communication, where the first set of reception instances is configured to provide the data communication from a second network node, determining a second QCL relationship to apply to a second set of reception instances of the set of multiple reception instances, where the second set of reception instances is configured to allow harvesting of energy from the data communication by the first network node, and receiving the first set of reception instances using the first QCL relationship and the second set of reception instances using the second QCL relationship.

An apparatus for wireless communications at a first network node is described. The apparatus may include memory and at least on processor coupled to the memory. The at least one processor may be configured to determine a first QCL relationship to apply to a first set of reception instances of a set of multiple reception instances of a data communication, where the first set of reception instances is configured to provide the data communication from a second network node, determine a second QCL relationship to apply to a second set of reception instances of the set of multiple reception instances, where the second set of reception instances is configured to allow harvesting of energy from the data communication by the first network node, and receive the first set of reception instances using the first QCL relationship and the second set of reception instances using the second QCL relationship.

Another apparatus for wireless communications at a first network node is described. The apparatus may include means for determining a first QCL relationship to apply to a first set of reception instances of a set of multiple reception instances of a data communication, where the first set of reception instances is configured to provide the data communication from a second network node, means for determining a second QCL relationship to apply to a second set of reception instances of the set of multiple reception instances, where the second set of reception instances is configured to allow harvesting of energy from the data communication by the first network node, and means for receiving the first set of reception instances using the first QCL relationship and the second set of reception instances using the second QCL relationship.

A non-transitory computer-readable medium storing code for wireless communications at a first network node is described. The code may include instructions executable by a processor to determine a first QCL relationship to apply to a first set of reception instances of a set of multiple reception instances of a data communication, where the first set of reception instances is configured to provide the data communication from a second network node, determine a second QCL relationship to apply to a second set of reception instances of the set of multiple reception instances, where the second set of reception instances is configured to allow harvesting of energy from the data communication by the first network node, and receive the first set of reception instances using the first QCL relationship and the second set of reception instances using the second QCL relationship.

Some examples of the method, apparatuses, and non-transitory computer-readable medium described herein may further include operations, features, means, or instructions for receiving scheduling information that configures the first network node to receive the set of multiple reception instances.

Some examples of the method, apparatuses, and non-transitory computer-readable medium described herein may further include operations, features, means, or instructions for receiving control information indicative of the first QCL relationship to apply for the first set of reception instances and the second QCL relationship to apply for the second set of reception instances.

Some examples of the method, apparatuses, and non-transitory computer-readable medium described herein may further include operations, features, means, or instructions for receiving one or more reference signals from the second network node and transmitting second control information to the second network node indicating measurement information for the one or more reference signals, where the second QCL relationship may be based on the measurement information.

Some examples of the method, apparatuses, and non-transitory computer-readable medium described herein may further include operations, features, means, or instructions for receiving control information indicative of a first TRP associated with the first set of reception instances and a second TRP associated with the second set of reception instances, where determining the first QCL relationship may be based on the first TRP being associated with the first set of reception instances, and where determining the second QCL relationship may be based on the second TRP being associated with the second set of reception instances.

Some examples of the method, apparatuses, and non-transitory computer-readable medium described herein may further include operations, features, means, or instructions for receiving one or more first reference signals from the first TRP, receiving one or more second reference signals from the second TRP, and transmitting second control information to the second network node indicating measurement information for the one or more first reference signals and the one or more second reference signals, where the control information may be based on the measurement information.

In some examples of the method, apparatuses, and non-transitory computer-readable medium described herein, the set of multiple reception instances may be a set of multiple downlink reception instances.

In some examples of the method, apparatuses, and non-transitory computer-readable medium described herein, the set of multiple reception instances may be a set of multiple sidelink reception instances.

In some examples of the method, apparatuses, and non-transitory computer-readable medium described herein, harvesting energy from the second set of reception instances.

Some examples of the method, apparatuses, and non-transitory computer-readable medium described herein may further include operations, features, means, or instructions for receiving the data communication via the first set of reception instances and the second set of reception instances.

DETAILED DESCRIPTION

Figure 1:
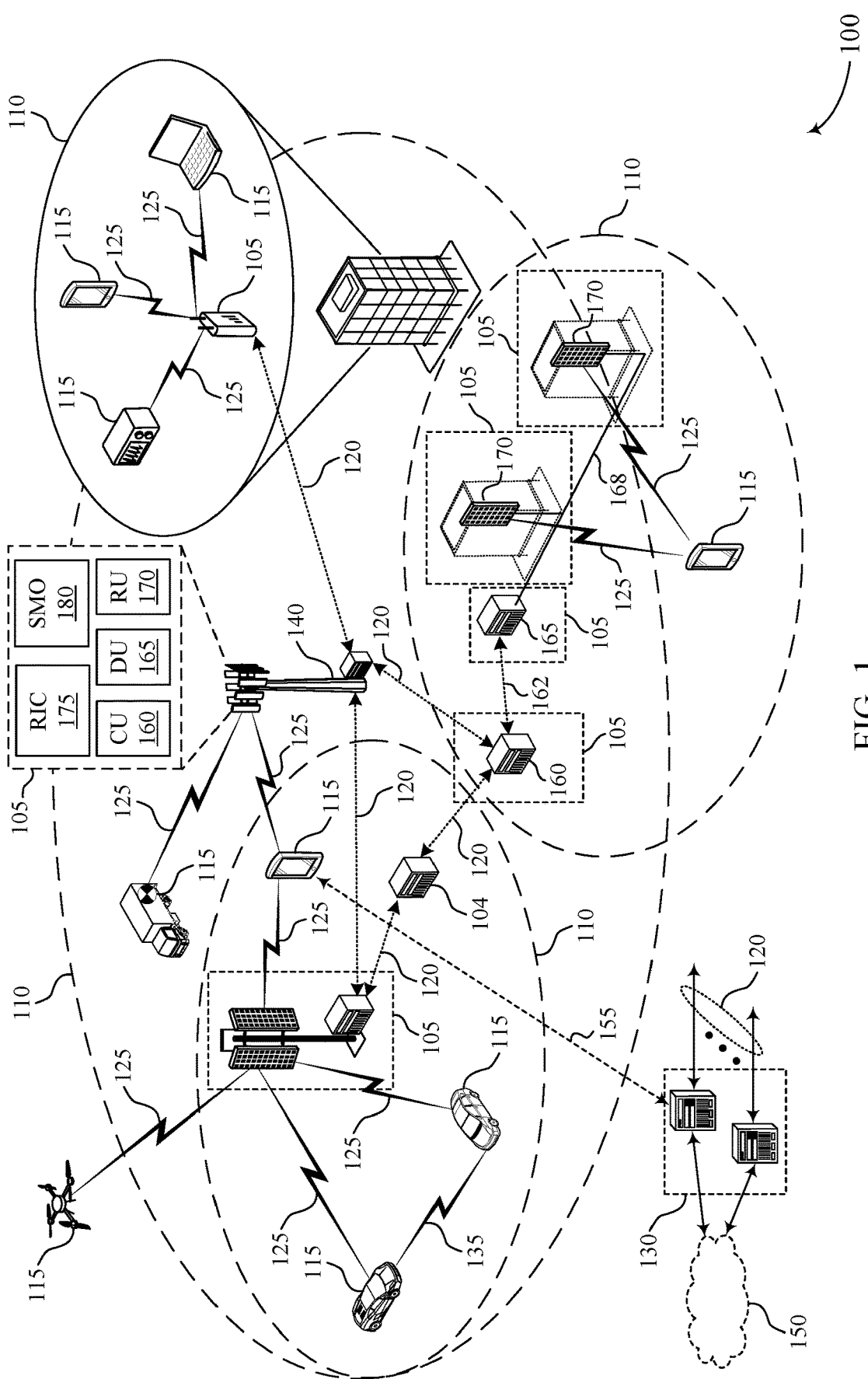
FIG. 1 illustrates an example of a wireless communications system that supports management of transmission instances for energy harvesting devices in accordance with one or more aspects of the present disclosure.

Some network devices, such as a user equipment (UE) or an internet of things (IoT) device may be configured to perform energy harvesting, meaning that the network device may harvest energy from the environment (e.g., solar, heat, and ambient radio frequency (RF) radiation). In particular, some network devices may harvest energy from RF radiation. For example, some network devices may include dedicated receiver architecture (e.g., a dedicated antenna and energy harvesting circuitry). Some network devices may share an antenna for data communications and energy harvesting. For example, a network device may include energy harvesting circuitry and information transmitting/receiving circuitry connected to a same antenna, and the network device may further be equipped with time switching or power splitting architecture to share the antenna between the energy harvesting and data transmission/reception functions. In some cases, data signals may be repeated a number of times (e.g., in a number of transmission instances) over a given beam (e.g., according to a given transmission configuration indicator (TCI) state). An energy harvesting device may capture some of the energy transmitted in the transmission instances. If the transmission beam used for the transmission instances is not directed toward the antenna of the energy harvesting device, energy harvesting may be ineffective.

Aspects of the present disclosure relate to beam management for energy harvesting for a scheduled set of transmission instances. For a set of scheduled transmission instances of a data communication, a transmitting network node may determine a first spatial filter to apply for a first subset of the scheduled transmission instances configured to provide the data communication and a second spatial filter to apply for a second subset of the scheduled transmission instances configured to allow energy harvesting at an energy harvesting device. Applying the second spatial filter enables the network node to direct the beam for the second subset of the scheduled transmission instances toward an antenna used for energy harvesting. In some cases, the energy harvesting device may be the transmitting network node itself. Accordingly, the transmitting device may self-recycle transmission energy for the second subset of transmission instances. In some cases, the energy harvesting device may be a different network node (e.g., a UE or IoT device) from the transmitting network node (e.g., a UE in sidelink transmissions or a network entity in downlink transmissions).

In some aspects, for example for uplink transmissions or for sidelink transmissions, the transmitting network node may receive control signaling indicating a first TCI state to use for the subset of data transmission instances and a second TCI state to use for the subset of energy harvesting transmission instances. The transmitting network node may select the first and second spatial filters based on the indicated first and second TCI states. In some cases, for example for downlink or sidelink transmissions, the transmitting network node may indicate a first quasi co-location (QCL) relationship to use for the first subset of the scheduled transmission instances configured to provide the data communication to the network node receiving the data transmissions, and the transmitting network node may indicate a second QCL relationship to use for the second subset of the scheduled transmission instances configured to allow energy harvesting to the energy harvesting device. Accordingly, the network node receiving the data transmissions and the energy harvesting device (which may be the same device) may configure respective receive beams to receive the transmitted data transmissions and energy harvesting transmissions.

Aspects of the disclosure are initially described in the context of wireless communications systems. Aspects of the disclosure are further illustrated by and described with reference to process flows, apparatus diagrams, system diagrams, and flowcharts that relate to management of transmission instances for energy harvesting devices.

FIG. 1 illustrates an example of a wireless communications system 100 that supports management of transmission instances for energy harvesting devices in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein.

For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, an RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission and reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support management of transmission instances for energy harvesting devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some network devices, such as a UE 115 or an IoT device may be configured to perform energy harvesting, meaning that the network device may harvest energy from the environment (e.g., solar, heat, and ambient RF radiation). Energy harvesting devices may store captured energy in a rechargeable battery. In particular, some network devices may harvest energy from RF radiation. RF energy sources may provide controllable and consistent energy transfer over distance for RF energy harvesters. In a fixed RF energy harvesting network, the harvested energy may be predictable and relatively stable over time due to fixed distances. The ways that network devices harvest and store energy may vary and may depend on device implementation.

Using a random multipath fading channel model, the energy $E_j$ harvested at node j from a transmitting node i may be given by $E_j=\eta P_i|g_{i\text{-}j}|^2 T$, where $P_i$ is the transmit power by node i, $g_{i\text{-}j}$ is the channel coefficient of the link between node i and node j, T is the time allocated for energy harvesting, and $\eta$ is the RF to direct current (DC) conversion efficiency. An energy harvesting device may include several major components including: a low-power microcontroller to process data; a low-power RF transceiver for information transmission or reception; energy harvesting circuitry to collect and convert RF signals into electricity including an RF antenna, impedance matching circuitry, a voltage multiplier and a capacitor; a power management module to determine whether to store electricity obtained from the energy harvesting circuitry or to use the electricity obtained from the energy harvesting circuitry immediately; and an energy storage device (e.g., a battery).

Variations in the amount of energy harvested and traffic may occur between different energy harvesting devices. Energy harvesting may be applicable in reduced capability modes and devices. Energy harvesting may also be applied in non-reduced capability cases. Energy harvesting may also be used separately from backscatter communications based passive IoT (e.g., where a device without a battery collects energy from ambient RF signals and redirects the energy, as in a radio frequency identifier (RFID) tag). For example, power consuming radio frequency components such as analog to digital converters, mixers, and oscillators may be used in energy harvesting devices.

Example energy harvesting devices include passive devices (e.g., electronic product code devices or proximity cards), semi-passive devices (e.g., used in electronic toll devices or pallet tracking), and active devices (e.g., used in large-asset tracking or livestock tracking). Passive devices may not include a battery (may use harvesting of RF energy as a sole power source), may respond to communications (e.g., may not initiate communications), and may have a range of 10 meters. Semi-passive devices may include a battery, may respond to communications (e.g., may not initiate communications), and may have a range of 100 or more meters. Active devices may include a battery, may initiate and respond to communications, and may have a range of 100 or more meters In some energy harvesting circuit designs, an energy harvesting device (e.g., a UE 115) may simultaneously receive energy and receive or transmit data. Some network devices may include dedicated receiver architecture (e.g., a dedicated antenna and energy harvesting circuitry). Some network devices may share an antenna for data communications and energy harvesting. For example, a network devices may include energy harvesting circuitry and information transmitting/receiving circuitry connected to a same antenna, and the network device may further be equipped with time switching or power splitting architecture to share the antenna between the energy harvesting and data transmission/reception functions. For example, time switching architecture enables an energy harvesting device to switch between the information receiver and the RF energy harvesting circuitry. In a time switching architecture, the energy $E_j$ harvested at node j from a transmitting node i may be given by $E_j=\eta P_i|g_{i-1}|^2\alpha T$, where $0\leq\alpha\leq1$ is the fraction of time allocated for energy harvesting. Letting $\kappa$ and W denote the noise spectral density and channel bandwidth, respectively, the data rate $R_{i-j}$ in a time switching architecture is given by $$R_{i-j} = (1-\alpha)\log_2\left(1 + \frac{|g_{i-j}|^2 P_i}{\kappa W}\right).$$

In a power splitting architecture, the received RF signals may be split into two streams for the information receiver and the RF energy harvesting circuitry with different power levels. The energy $E_j$ harvested at the receiver node j from the transmitting node i may be calculated as $E_j=\eta\rho P_i|g_{i-j}|^2 T$, where $0\leq\rho\leq1$ is the fraction of power allocated for energy harvesting. In the power splitting architecture, the data rate $R_{i-j}$ may be given by $$R_{i-j} = \log_2\left(1 + \frac{|g_{i-j}|^2(1-\rho)P_i}{\kappa W}\right).$$

In some cases, the UE 115 may include switching panels or dedicated panels for each purpose (e.g., harvesting of energy and receiving or transmitting data). For example, the UE 115 may allocate some antennas for energy harvesting purposes. In some cases, antenna allocation may be static (e.g., in some cases the given antennas may be allocated all the time for energy harvesting purposes). In some cases, the allocation of antennas for energy harvesting purposes may be dynamic. As described herein, transmission repetition (e.g., for uplink, downlink, or sidelink) and QCL relationships may be selected to improve energy harvesting and data efficiency. For example, the network entity 105 may indicate the QCL relationship between an uplink transmission beam and a previously received reference signal. For a network entity 105-a with multiple TRPs, QCL relationships for transmission repetitions may also be selected to improve energy harvesting and data efficiency. For example, if a UE 115 is configured to transmit uplink transmission instances to multiple TRPs (each TRP corresponding to one QCL type D), the UE 115 may indicate a preferred TRP for energy harvesting. The network entity 105 may configure the UE 115 with an asymmetric number of repetitions (e.g., transmission instances) per TRP (in the downlink case, towards the data panel). In other words, the network entity 105 may configure an asymmetric number of repetitions toward the preferred TRP for energy harvesting or for data reception or transmission.

In some cases, data signals may be repeated a number of times (e.g., in a number of transmission instances) over a given beam (e.g., according to a given TCI state). An energy harvesting device may capture some of the energy transmitted in the transmission instances. If the transmission beam used for the transmission instances is not directed toward the antenna of the energy harvesting device, energy harvesting may be ineffective.

Accordingly, for a set of scheduled transmission instances of a data communication, a transmitting network node may determine a first spatial filter to apply for a first subset of the scheduled transmission instances configured to provide the data communication and a second spatial filter to apply for a second subset of the scheduled transmission instances configured to allow energy harvesting at an energy harvesting device. Applying the second spatial filter enables the network node to direct the beam for the second subset of the scheduled transmission instances toward an antenna used for energy harvesting. In some cases, the energy harvesting device may be the transmitting network node itself. Accordingly, the transmitting device may self-recycle transmission energy for the second subset of transmission instances. In some cases, the energy harvesting device may be a different network node (e.g., a UE 115 or IoT device) from the transmitting network node (e.g., a UE 115 in sidelink transmissions or a network entity in downlink transmissions).

In some aspects, for example for uplink transmissions or for sidelink transmissions, the transmitting network node may receive control signaling indicating a first TCI state to use for the subset of data transmission instances and a second TCI state to use for the subset of energy harvesting transmission instances. The transmitting network node may select the first and second spatial filters based on the indicated first and second TCI states. In some cases, for example for downlink or sidelink transmissions, the transmitting network node may indicate a first QCL relationship to use for the first subset of the scheduled transmission instances configured to provide the data communication to the network node receiving the data transmissions, and the transmitting network node may indicate a second QCL relationship to use for the second subset of the scheduled transmission instances configured to allow energy harvesting to the energy harvesting device. Accordingly, the network node receiving the data transmissions and the energy harvesting device (which may be the same device) may configure their respective receive beams to receive the transmitted data transmissions and energy harvesting transmissions.

Figure 2:
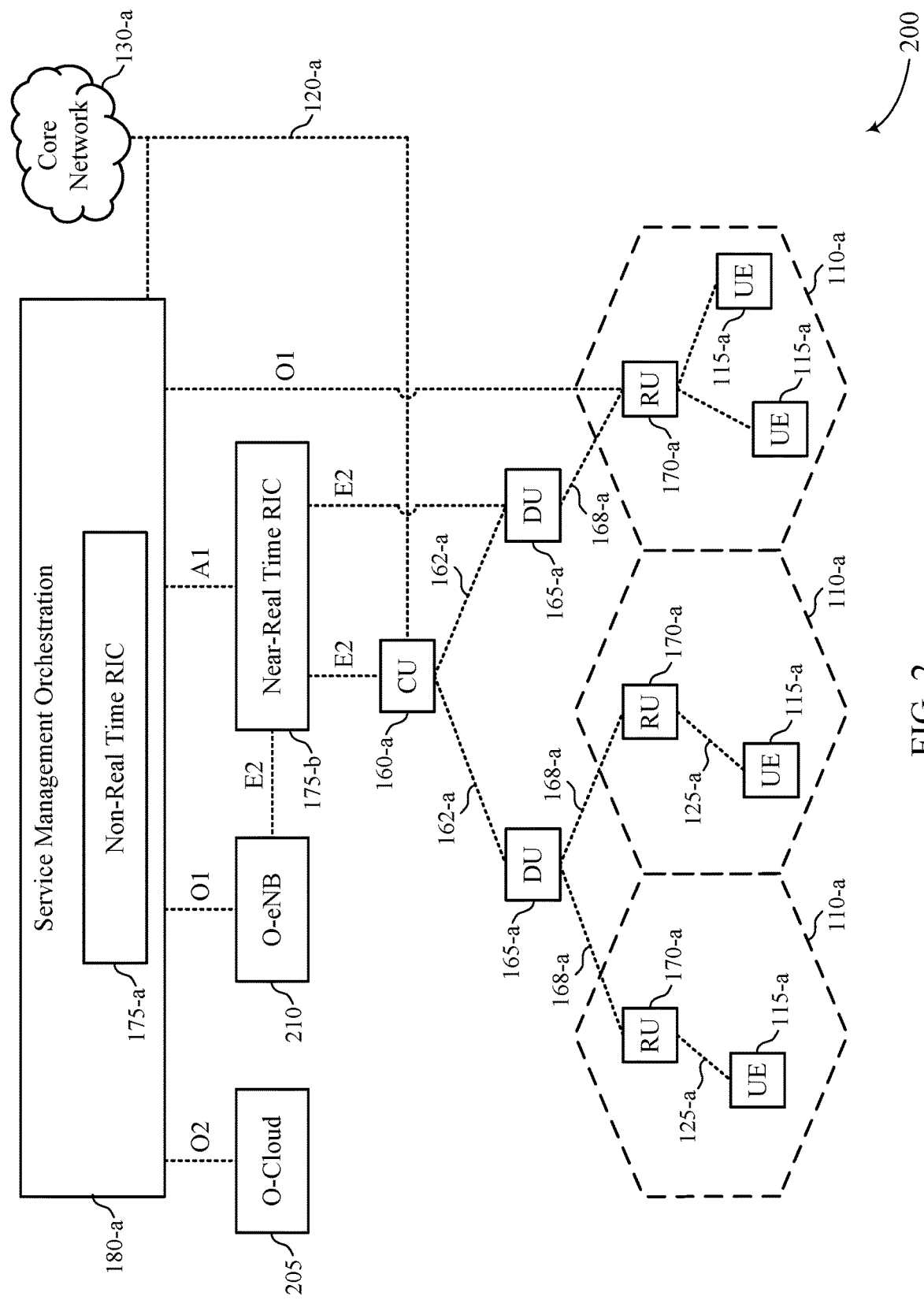
FIG. 2 illustrates an example of a network architecture that supports management of transmission instances for energy harvesting devices in accordance with one or more aspects of the present disclosure.

FIG. 2 illustrates an example of a network architecture 200 (e.g., a disaggregated base station architecture, a disaggregated RAN architecture) that supports management of transmission instances for energy harvesting devices in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some aspects, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some aspects, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some aspects, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) based on a functional split, such as those defined by the 3rd Generation Partnership Project (3GPP). In some aspects, a DU 165-*a* may further host one or more low PHY layers. Each layer may be implemented with an interface configured to communicate signals with other layers hosted by the DU 165-*a*, or with control functions hosted by a CU 160-*a*.

In some aspects, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some aspects, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some aspects, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some aspects, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
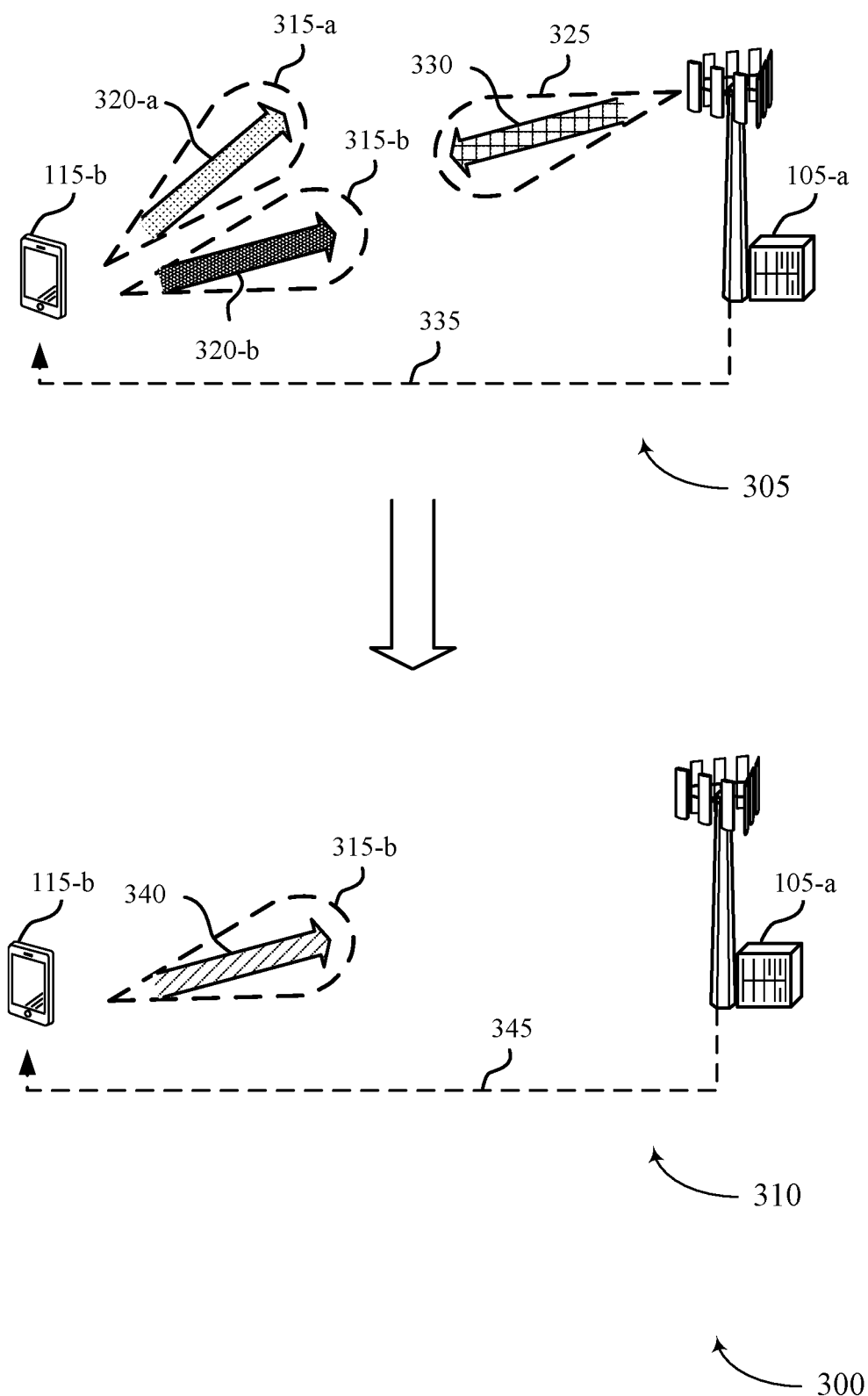
FIG. 3 illustrates an example of a wireless communications system that supports management of transmission instances for energy harvesting devices in accordance with one or more aspects of the present disclosure.

FIG. 3 illustrates an example of a wireless communications system 300 that supports management of transmission instances for energy harvesting devices in accordance with one or more aspects of the present disclosure. In some aspects, the wireless communications system 300 may implement aspects of wireless communications system 100. The wireless communications system 300 may include a UE 115-b, which may be an example of a UE 115 as described herein. The wireless communications system 300 may include a network entity 105-a, which may be an example of a network entity 105 as described herein.

Beam indication to the UE 115-b for uplink transmissions may be performed through spatial relations that provide a reference signal based on which the UE 115-b may determine the transmit beam. Example reference signals include a synchronization signal block (SSB) or a physical broadcast channel (PBCH). The beam used by the UE 115-b to receive a given SSB or PBCH may be used as a transmit beam for the UE 115-b. Another example reference signal is a channel state information reference signal (CSI-RS). The beam used by the UE 115-b to receive a given CSI-RS resource may be used as a transmit beam for the UE 115-b. Another example reference signal is a sounding reference signal (SRS). The uplink transmit beam used to transmit a given SRS resource may be used as a transmit beam for the UE 115-b. For a physical uplink control channel (PUCCH), each resource may include 8 spatial relations, and one of the 8 spatial relations may be activated via a MAC control element (CE).

With respect to SRS beam management, the beam switch mechanism for periodic SRSs may be RRC (semi-static), and the beam management reference signal may be an SSB, PBCH, periodic CSI-RS, semi-persistent CSI-RS, or periodic SRS. The beam switch mechanism for semi-persistent SRS may be a MAC-CE (dynamic), and the beam management reference signal may be an SSB, PBCH, semi-persistent CSI-RS, periodic SRS, or semi-persistent SRS. The beam switch mechanism for aperiodic SRS may be RRC (dynamic) or MAC-CE, and the beam management reference signal may be an SSB, PBCH, periodic CSI-RS, semi-persistent CSI-RS, periodic SRS, semi-persistent SRS, or aperiodic SRS. Unified TCI states may be defined for uplink or downlink signals or channels. A number N uplink TCI states may be defined for a physical uplink shared channel (PUSCH) and a subset of PUCCH resources. Joint uplink and downlink or separate uplink and downlink TCI states may be defined.

As shown, at a first step 305, a UE 115-b may transmit a first SRS 320-a using a first beam 315-a and a second SRS 320-b using a second beam 315-b. The network entity 105-a may transmit a downlink reference signal 330 (e.g., an SSB, PBCH, or CSI-RS) using a beam 325. The network entity 105-a may provide feedback information 335 that may include an SRS resource indicator (SRI) or a transmitted rank indicator (TRI). For example, the feedback information 335 may indicate that the second beam 315-b is preferred by the network entity 105-a for uplink transmissions based on measurements of the first SRS 320-a and the second SRS 320-b.

At a second step 310, the UE 115-b may transmit a PUSCH transmission 340 using the second beam 315-b (which was indicated in the feedback information 335). The network entity 105-a may provide feedback information 345 (e.g., HARQ feedback) for the PUSCH transmission 340.

Figure 4:
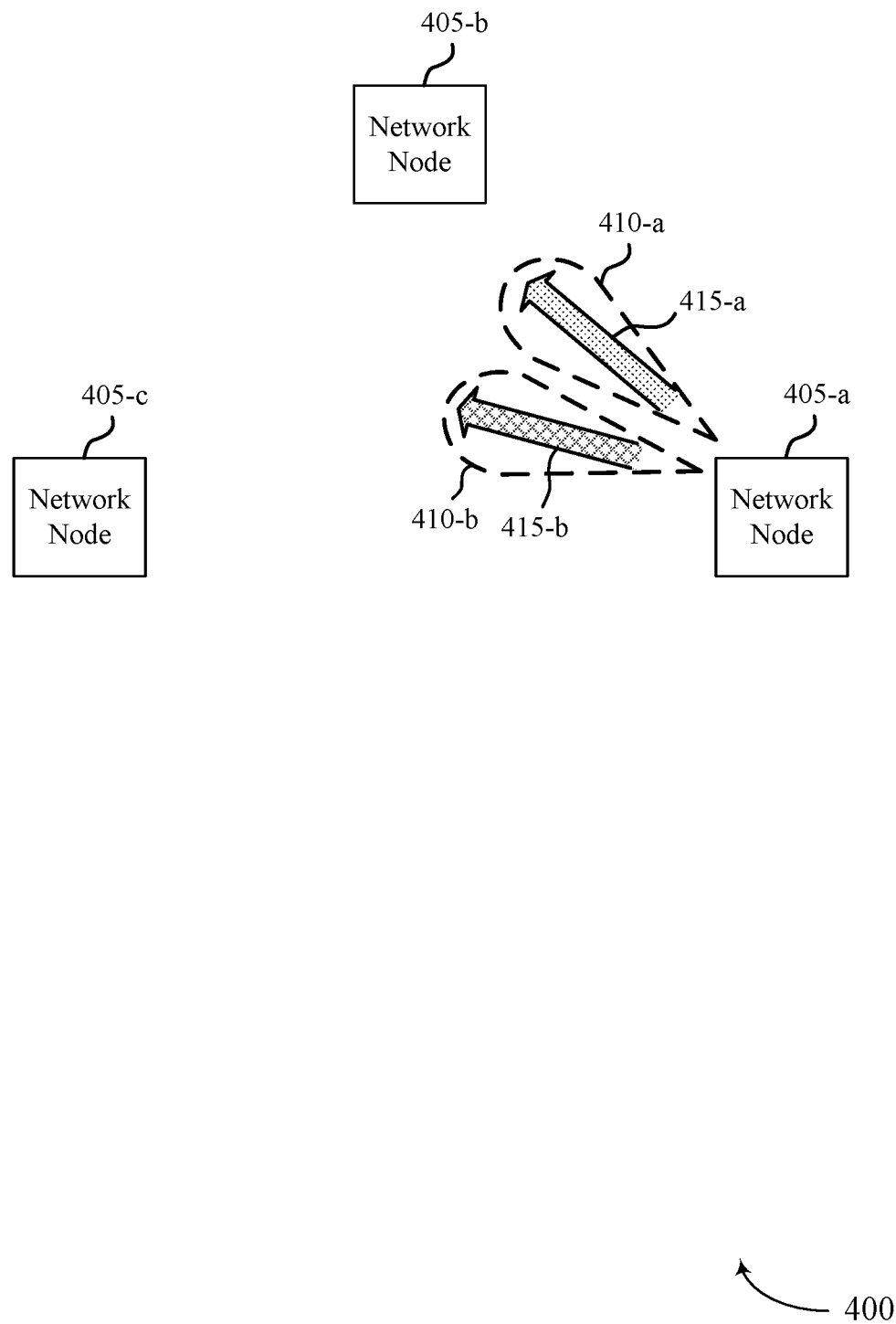
FIG. 4 illustrates an example of a wireless communications system that supports management of transmission instances for energy harvesting devices in accordance with one or more aspects of the present disclosure.

FIG. 4 illustrates an example of a wireless communications system 400 that supports management of transmission instances for energy harvesting devices in accordance with one or more aspects of the present disclosure. In some aspects, the wireless communications system 400 may implement aspects of wireless communications system 100. For example, the first network node 405-a, the second network node 405-b, and the third network node 405-c may be a UE 115 or a network entity 105 as described herein.

The first network node 405-a may be scheduled with a set of transmission instances for a data communication (e.g., a set of uplink, downlink or sidelink transmissions with repetition). The first network node 405-a may transmit the same data communication with at least two different beams, the first beam 410-a and the second beam 410-b. One beam (e.g., generated using a first spatial filter) may be better for transmitting data to a second network node 405-b, and another beam (e.g., generated using a second, different, spatial filter) may be better for transmitting energy to a third network node 405-c. Additionally, the best spatial filter to receive signals at the second network node 405-b and the third network node 405-c may depend (e.g., change) on the first spatial filter used to transmit data to the second network node 405-b. The network (e.g., in the case of uplink the second network node 405-b which may correspond to a network entity 105) may indicate to the first network node 405-a (e.g., in the case of uplink the first network node 405-a may correspond to a UE 115) to use a same transmit filter used to transmit a previous reference signal (e.g., SRS, CSI-RS, or SSB). The energy harvesting network node 405-c may determine which spatial filter to apply based on previous measurements based on configured reference signals to be sent from the first network node 405-a (e.g., based on reference signals associated with data such as demodulation reference signals (DMRSs) in PUCCH, PUSCHs, or physical sidelink shared channels (PSSCHs), or without data such as SRSs or sidelink reference signals). The energy harvesting network node 405-c may be configured to perform measurements of the reference signals on dedicated resources.

The energy harvesting network node 405-c may transmit measurement information (e.g., the reference signal received power (RSRP), reference signal received quality (RSRQ), or signal to interference and noise ratio (SINR)) for each reference signal identifier or measurement occasion (e.g., associated with a given filter used at the energy harvesting network node 405-c). Based on the measurement information, the energy harvesting network node 405-c may determine the best beam (e.g., the second beam 410-b) to receive signals from the first network node 405-a.

Based on the measurement reports from the energy harvesting network node 405-c to the second network node 405-b or the first network node 405-a, the network (e.g., a serving network entity, which may be the second network node 405-b in uplink cases), may indicate for the first network node 405-a to use the first beam 410-a for a first subset 415-a of a scheduled set of transmission instances of a data communication configured to provide the data communication to the second network node 405-b. The network may indicate for the first network node 405-a to use the second beam 410-b for a second subset 415-b of the scheduled set of transmissions of the data communication configured to allow harvesting of energy from the data communication by the third network node 405-c. For example, the network may indicate to the first network node 405-a to transmit the first subset 415-a using the first beam 410-a that was used to transmit a first reference signal and to transmit the second subset 415-b using the second beam 410-b that was used to transmit a second reference signal. The configuration and training process may be performed through a network entity 105 in sidelink, uplink, or downlink cases (e.g., which may be the second network node 405-*b*). In the case of sidelink, the network nodes 405 may be UEs 115, which may perform the configuration and training process in an autonomous manner (e.g., similarly to mode 2 random access procedures used to find resources for data and reference signal transmission). The configuration may include the time and frequency resources and the reference signal configurations (e.g., scrambling identifier, modulation) of the reference signals as well as the identifiers for the reference signals. For downlink cases (e.g., where the first network node 405-*a* is a network entity 105 and the second network node is a UE 115), the network entity 105 may indicate to the receiving UE 115 and the energy harvesting network node 405-*c* to use beams used to previously receive reference signals to receive the first subset 415-*a* or the second subset 415-*b*. The first network node 405-*a* may change spatial filters (and accordingly transmission beams) across transmission instances (e.g., for the first subset 415-*a* and the second subset 415-*b*) accordingly.

For example, in an uplink case, the first network node 405-*a* may correspond to a UE 115, the second network node 405-*b* may correspond to a network entity 105, and the energy harvesting network node 405-*c* may correspond to a UE 115 (and may be the same UE 115 as the first network node 405-*a* or a different UE 115). The second network node 405-*b* in an uplink case may indicate the QCL relationship between a data signal and a corresponding reference signal (e.g., SSB, CSI-RS, or SRS) so that the first network node 405-*a* may adjust the beam of the data signal based on the beam used to receive or transmit the reference signal. In addition to the QCL type D relationship between the transmission beam and the receive beam for data, which may be indicated by the second network node 405-*b* to the first network node 405-*a*, the energy harvesting network node 405-*c* may report the preferred QCL type D relationship with respect to a reference signal for energy harvesting. Accordingly, the first network node 405-*a* may determine QCL or TCI information (e.g., spatial relationship information) for energy harvesting purposes at the energy harvesting network node 405-*c*. The first network node 405-*a* may change a transmission spatial filter for the first the first subset 415-*a* and the second subset 415-*b*. The second network node 405-*b* may change a receive filter for the first subset 415-*a* and the second subset 415-*b* accordingly.

In some uplink cases, the second network node 405-*b* may indicate the QCL relationship between a reference signal and the first subset 415-*a* and the QCL relationship between the a reference signal and the second subset 415-*b*. The first network node 405-*a* may change transmission spatial filters for the first subset 415-*a* and the second subset 415-*b* accordingly, and the second network node 405-*b* may change reception spatial filters for the first subset 415-*a* and the second subset 415-*b* accordingly. In some uplink cases, the second network node 405-*b* may indicate which transmission instances in the set of transmission instances of the data communication correspond to the first subset 415-*a* and the second subset 415-*b*. The number of transmission instances in each of the first subset 415-*a* and the second subset 415-*b* may affect the amount of harvested energy at the energy harvesting network node 405-*c* and the data reliability. In some cases, the number of transmission instances in each of the first subset 415-*a* and the second subset 415-*b* may be based on the priority of the data communication or a charging rate demand for the energy harvesting network node 405-*c*. For example, the energy harvesting network node 405-*c* may transmit a charging rate report that reports charging rates for various reference signals received via the candidate beams. In some cases, a charging rate report may include 1 bit indicating whether the charging rate satisfied a given (e.g., preconfigured) threshold. In some cases, the charging rate report may include a multi bit report indicating charging rate levels (e.g., a 2 bit report may indicate no charging, bad charging rate, good charging rate, or very bad charging rate, or a 2 bit report may indicate 4 level representations based on 3 configured thresholds). More configured thresholds and bits may be used for more granular reports. The number of bits in a charging rate report may be based on layer 1, layer 2, or layer 3 signaling between the network nodes 405.

In some cases, where the first network node 405-*a* is different from the third network node 405-*c* that performs energy harvesting on the second set of transmission instances), the first network node 405-*a* may transmit the first subset 415-*a* using the first spatial filter and a first transmission power level and the first network node 405-*a* may transmit the second subset 415-*b* using the second spatial filter and a second transmission power level different than the first transmission power level. For example, the second transmission power level may be higher than the first transmission power level to convey more energy to the third network node 405-*c*. In some cases, the second transmission power level may be based on a reliability demand at the first network node 405-*a* (e.g., a TRP or a network entity) or a charging rate at the energy harvesting network node 405-*c*.

In some uplink cases, the first network node 405-*a* may also be the energy harvesting network node 405-*c* or may cooperate with the energy harvesting network node 405-*c*. In such cases, the first network node 405-*a* may transmit a preferred number of transmission instances in the second subset 415-*b* for energy harvesting purposes. The second subset 415-*b* may transmit the same data communication as the first subset 415-*a* (e.g., a PUSCH, PUCCH, or SRS) using the second beam 410-*b* preferred for energy harvesting at the energy harvesting network node 405-*c* (which may be the same as the first network node 405-*a* or may be a different UE 115).

In an uplink case where the first network node 405-*a* may correspond to a UE 115, and the energy harvesting network node 405-*c* may correspond to a different UE 115, the first network node 405-*a* may transmit the second subset 415-*b* in the direction of the energy harvesting network node 405-*c*, where the second beam 410-*b* has a QCL relationship with a reference signal received by the energy harvesting network node 405-*c* from the first network node 405-*a*. The QCL relationship may be indicated by the first network node 405-*a* to a reference signal via by the second network node 405-*b*. The reference signal may be an SRS used in cross-link measurements.

As another example, in downlink case, the first network node 405-*a* may correspond to a network entity 105, the second network node 405-*b* may correspond to a UE 115, and the energy harvesting network node 405-*c* may correspond to a UE 115 (and may be the same UE 115 as the second network node 405-*b* or a different UE 115). When the second network node 405-*b* and the third network node 405-*c* are a same UE 115 (e.g., one UE with dedicated panels for data communications and energy harvesting), the first network node 405-*a* may configure the second network node 405-*b* with two QCL relationships for purposes of data reception (e.g., for the first subset 415-*a*) and energy harvesting (e.g., for the second subset 415-*b*). The first network node 405-*a* may transmit the first subset 415-*a* using the first beam 410-*a* to the panel for data communications and the second subset 415-*b* using the second beam 410-*b* to the panel for energy harvesting. The UE 115 that includes the second network node 405-*b* and the energy harvesting network node 405-*c* may use the beamformed data signals in the second subset 415-*b* to improve decodability of the data. The UE 115 that includes the second network node 405-*b* and the energy harvesting network node 405-*c* may adjust analog filters accordingly.

Figure 5:
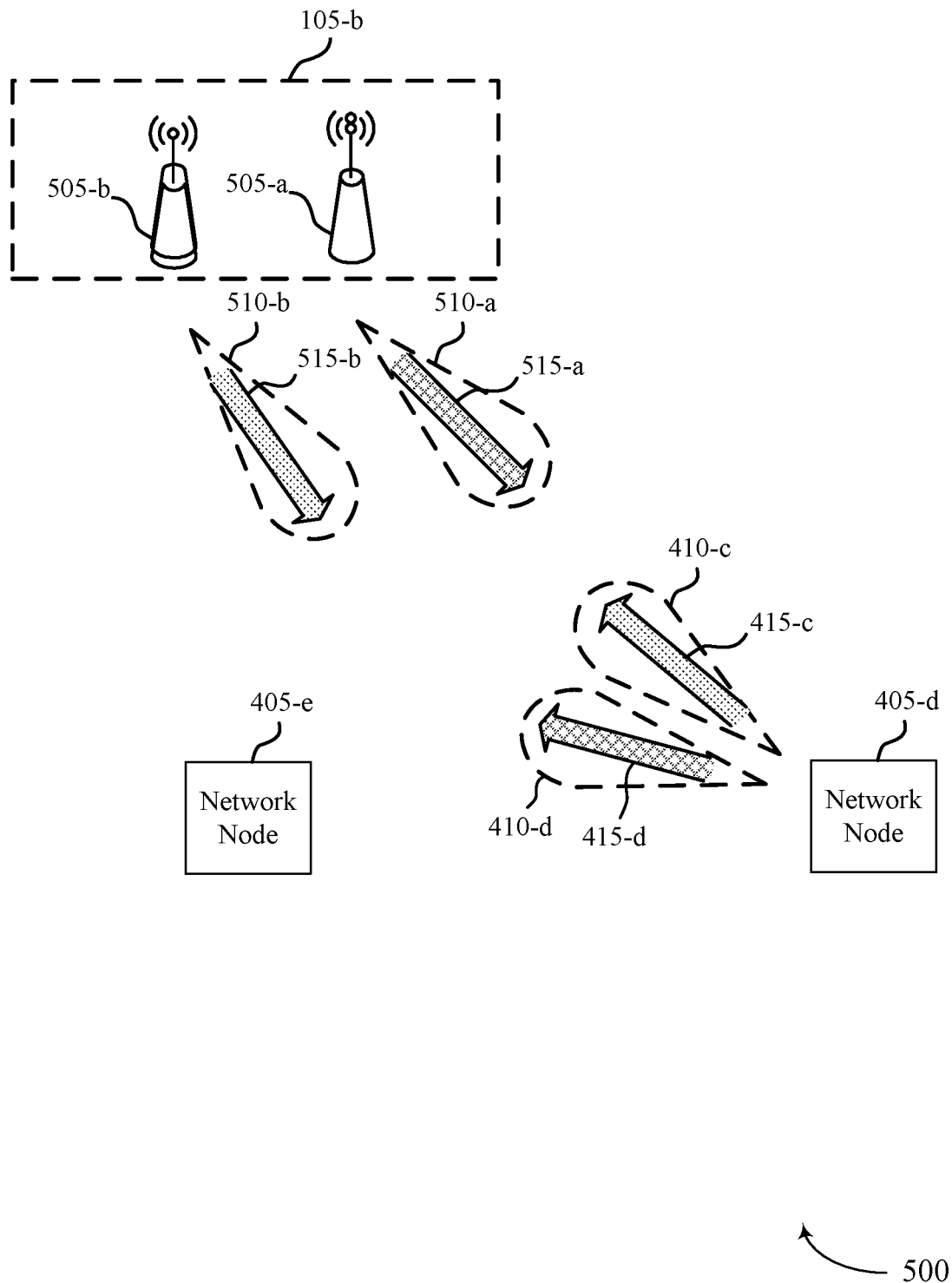
FIG. 5 illustrates an example of a wireless communications system that supports management of transmission instances for energy harvesting devices in accordance with one or more aspects of the present disclosure.

FIG. 5 illustrates an example of a wireless communications system 500 that supports management of transmission instances for energy harvesting devices in accordance with one or more aspects of the present disclosure. In some aspects, the wireless communications system 500 may implement aspects of wireless communications system 100. The wireless communications system 500 may include a network entity 105-*b*, which may be an example of a network entity 105 as described herein.

A network node 405-*d* may operate in a multiple TRP mode with a first TRP 505-*a* and a second TRP 505-*b*. In some cases, the first TRP 505-*a* and the second TRP 505-*b* may be located at a same network entity 105-*b*. In some cases, the first TRP 505-*a* and the second TRP 505-*b* may be located at different network entities.

In uplink cases, the network node 405-*d* may be a UE 115 as described herein. The network node 405-*d* may be configured to transmit uplink transmissions to the first TRP 505-*a* via a first beam 410-*c* and transmit uplink transmissions to the second TRP 505-*b* via a second beam 410-*d*. For example, the first TRP 505-*a* may be associated with a first QCL type D relationship and the second TRP 505-*b* may be associated with a second QCL type D relationship.

The network node 405-*e* may be an energy harvesting device. In some cases, the network node 405-*e* may be a same UE 115 as the network node 405-*d*. In some cases, the network node 405-*e* may be a different UE 115 than the network node 405-*d*. As described herein, the network node 405-*e* may report measurement information for previous reference signals. Based on the measurement information, the network entity 105-*b* may identify a preferred transmit beam for energy harvesting at the network node 405-*e*. For example, a reference signal transmitted via the second beam 410-*d* may provide more energy or have a higher charging rate than a reference signal transmitted via the first beam 410-*c*. Accordingly, the network entity 105-*b* may configure the network node 405-*d* with an asymmetric number of transmission instances directed toward the second TRP via the second beam 410-*d*. For example, the network entity 105-*b* may schedule a set of uplink transmission instances of a data communication from the network node 405-*d* to the network entity 105-*b* via the first TRP 505-*a* and the second TRP 505-*b*. A first subset 415-*c* of the transmission instances of the data communication may be directed to the first TRP 505-*a* via the first beam 410-*c*, and a second subset 415-*d* of the transmission instances of the data communication may be directed to the second TRP 505-*b* via the second beam 410-*d*. To enhance energy harvesting at the network node 405-*e*, the network entity 105-*b* may schedule more transmission instances in the second subset 415-*d* than in the first subset 415-*c* (e.g., more transmission instances may be directed toward the second TRP 505-*b* for purposes of energy harvesting at the network node 405-*e*).

In downlink cases, the network node 405-*d* may be a UE 115 as described herein. The network entity 105-*b* may transmit downlink transmissions to the network node 405-*d* via the first TRP 505-*a* via a first beam 510-*a* and via the second TRP 505-*b* via a second beam 510-*b*. For example, the first TRP 505-*a* may be associated with a first QCL type D relationship and the second TRP 505-*b* may be associated with a QCL type D relationship. The network node 405-*e* may be an energy harvesting device. In some cases, the network node 405-*e* may be a same UE 115 as the network node 405-*d*. The network node 405-*d* may indicate a preferred TRP from the perspective of energy harvesting.

For example, as described herein, the network node 405-*e* may report measurement information for previous reference signals. Based on the measurement information, the network entity 105-*b* may identify a preferred transmit beam for energy harvesting at the network node 405-*e*. For example, a reference signal transmitted via the second beam 510-*b* may provide more energy or be associated with a higher charging rate than a reference signal transmitted via the first beam 510-*a*. Accordingly, the network entity 105-*b* may configure an asymmetric number of transmission instances via the first TRP 505-*a* and the second TRP 505-*b*. For example, the network entity 105-*b* may schedule a set of downlink transmission instances of a data communication via the first TRP 505-*a* and the second TRP 505-*b*. A first subset 515-*a* of the downlink transmission instances of the data communication may be transmitted via the first TRP 505-*a* via the first beam 510-*a*, and a second subset 515-*b* of the transmission instances of the data communication may be transmitted via the second TRP 505-*b* via the second beam 510-*b*. To enhance energy harvesting at the network node 405-*e*, the network entity 105-*b* may schedule more transmission instances in the second subset 515-*b* than in the first subset 515-*a* (e.g., more transmission instances may be directed toward the energy harvesting antenna panel for purposes of energy harvesting).

Figure 6:
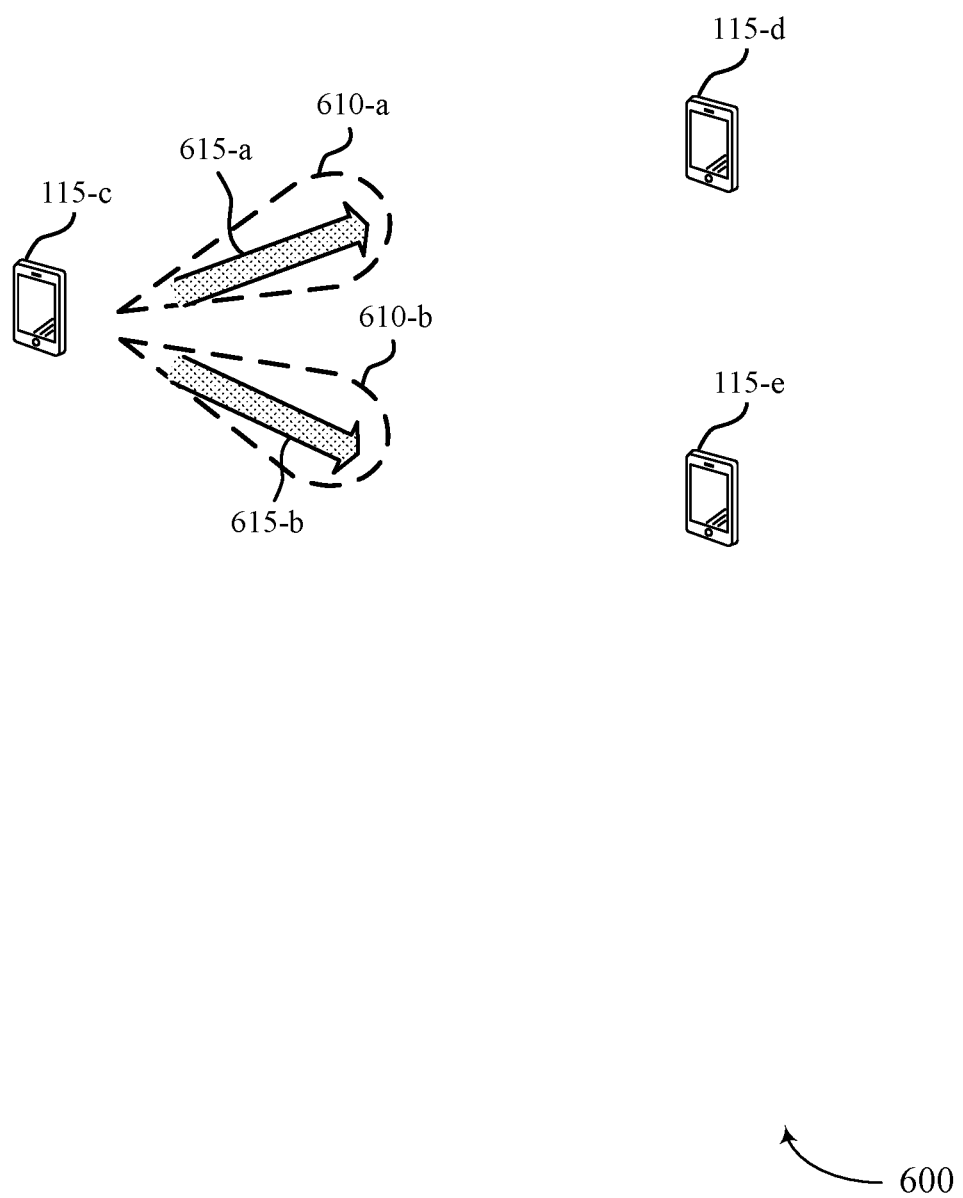
FIG. 6 illustrates an example of a wireless communications system that supports management of transmission instances for energy harvesting devices in accordance with one or more aspects of the present disclosure.

FIG. 6 illustrates an example of a wireless communications system 600 that supports management of transmission instances for energy harvesting devices in accordance with one or more aspects of the present disclosure. In some aspects, the wireless communications system 600 may implement aspects of wireless communications system 100. The wireless communications system 600 may include a first UE 115-*c*, a second UE 115-*d*, and a third UE 115-*e*, which may be examples of a UE 115 as described herein.

In sidelink cases, a first UE 115-*c* may communicate with one or more other UEs 115 (e.g., the second UE 115-*d* and the third UE 115-*e*), which may be energy harvesting devices. The first UE 115-*c* may transmit a first subset 615-*a* of transmission instances of a data communication (e.g., a physical sidelink shared channel (PSSCH) transmission) using a first beam 610-*a* in the direction of the second UE 115-*d* and a second subset 615-*b* of the transmission instances of the data communication using a second beam 610-*b* in the direction of the third UE 115-*e*. The first subset 615-*a* may be configured to provide the data communication the second UE 115-*d* and the second subset 615-*b* may be configured to allow harvesting of energy from the data communication by the third UE 115-*e*. The first beam 610-*a* and the second beam 610-*b* may be selected and indicated based on prior sidelink reference signals transmitted by the first UE 115-*c*. For example, the first subset 615-*a* may have a QCL relationship with a sidelink reference signal transmitted via the first beam 610-*a* and the second subset 615-*b* may have a QCL relationship with a sidelink reference signal transmitted via the second beam 610-*b*. The first UE 115-*c* may transmit the QCL relationship information for the first subset 615-*a* and the second subset 615-*b* to the second UE 115-*d* and the third UE 115-*e*, and the second UE 115-*d* and the third UE 115-*e* may adjust receive beams accordingly.

In some cases, multiple UEs 115 may transmit sidelink transmissions. Similarly to the multiple TRP cases as described with reference to FIG. 5, the multiple transmitting UEs 115 may communicate with the third UE 115-e (the energy harvesting UE) and the second UE 115-d.

Figure 7:
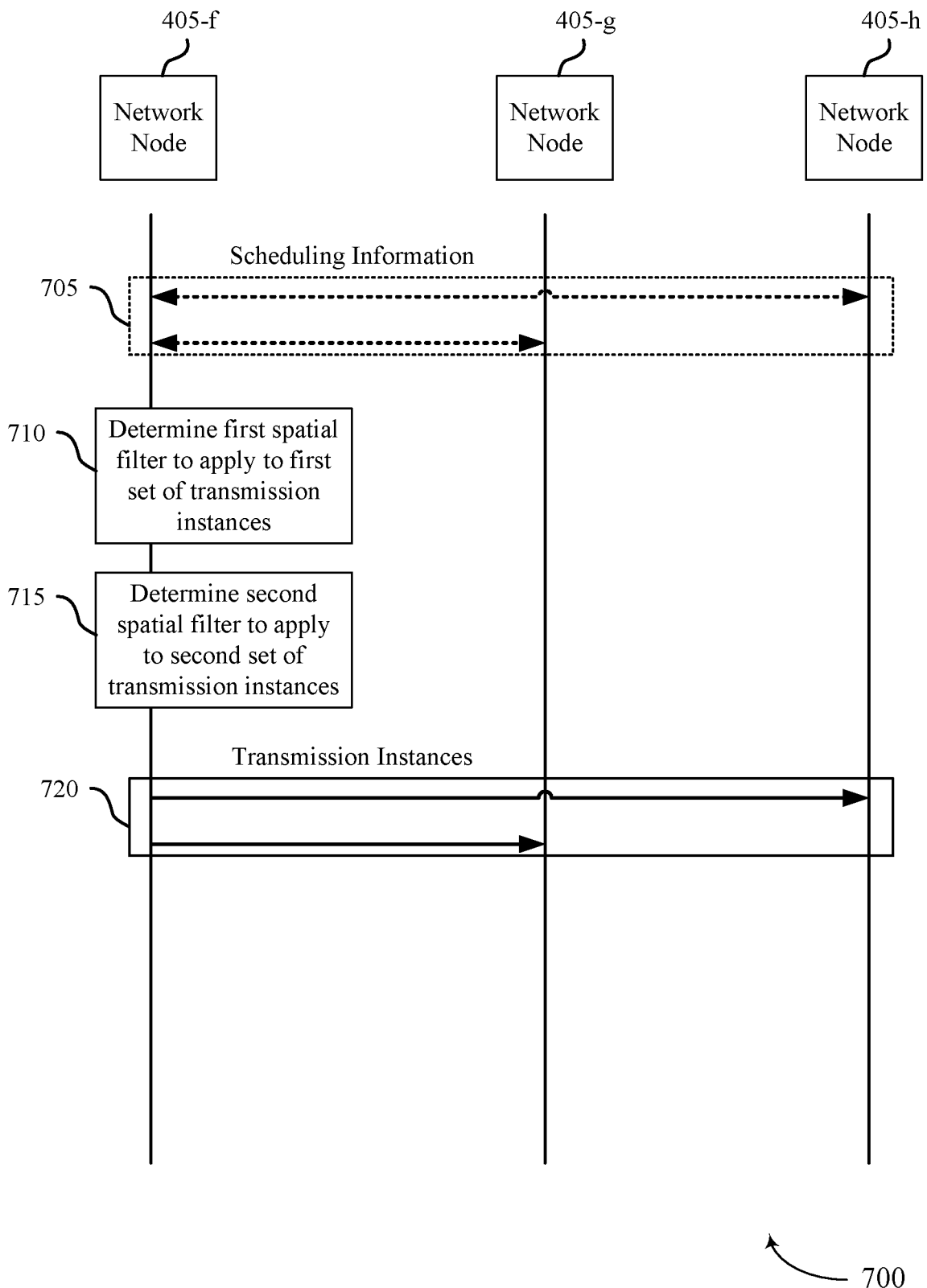
FIG. 7 illustrates an example of a process flow that supports management of transmission instances for energy harvesting devices in accordance with one or more aspects of the present disclosure.

FIG. 7 illustrates an example of a process flow 700 that supports management of transmission instances for energy harvesting devices in accordance with one or more aspects of the present disclosure. The process flow 700 may include a first network node 405-f, a second network node 405-g, and a third network node 405-h. In the following description of the process flow 700, the operations between the first network node 405-f, the second network node 405-g, and the third network node 405-h may be transmitted in a different order than the example order shown, or the operations performed by the first network node 405-f, the second network node 405-g, and the third network node 405-h may be performed in different orders or at different times. Some operations may also be omitted from the process flow 700, and other operations may be added to the process flow 700.

In some cases, at 705, the first network node 405-f may communicate scheduling information for a number of multiple transmission instances of a data communication with the second network node 405-g or the third network node 405-h.

At 710, the first network node 405-f may determine a first spatial filter to apply to a first set of transmission instances of the number of multiple of transmission instances of the data communication, where the first set of transmission instances is configured to provide the data communication to the second network node 405-g.

At 715, the first network node 405-f may determine a second spatial filter to apply to a second set of transmission instances of the number of multiple transmission instances, where the second set of transmission instances is configured to allow harvesting of energy from the data communication by the third network node 405-h.

At 720, the first network node 405-f may transmit the first set of transmission instances using the first spatial filter and the second set of transmission instances using the second spatial filter.

In some cases, for example when the first network node 405-f is a UE 115, the communicating scheduling information at 705 may include receiving the scheduling information that configures the first network node 405-f to receive the number of multiple transmission instances. In some cases, the first network node 405-f may receive control information indicative of a first TCI state associated with the first set of transmission instances and a second TCI state associated with the second set of transmission instances. The first network node 405-f may determine the first spatial filter based on the first TCI state, and the first network node 405-f may determine the second spatial filter based on the second TCI state. In some cases, for example where the first network node 405-f is a same UE 115 as the third network node 405-h, the first network node 405-f may transmit control information indicative of a QCL relationship for energy harvesting at the first network node 405-f, and the second TCI state may be based on the control information indicative of the QCL relationship for energy harvesting at the first network node 405-f. In some cases, the first network node 405-f may receive one or more reference signals from the second network node 405-g, and the first network node 405-f may identify the QCL relationship for harvesting of energy at the first network node 405-f based on measurement information corresponding to the one or more reference signals. In some cases, the measurement information may include charging rate information for harvesting of energy associated with the one or more reference signals. In some cases, the first network node 405-f may receive one or more reference signals from the second network node 405-g, and the first network node 405-f may transmit control information to the second network node 405-g indicating measurement information for the one or more reference signals, and the second TCI state may be based on the measurement information. In some cases, the measurement information includes, for the one or more reference signals, at least one of an SINR, an RSRP, an RSRQ, or charging rate information that pertains to harvesting of energy. In some cases, the charging rate information that pertains to harvesting of energy includes a one bit or multi-bit indicator of charging rate sufficiency based on one or more thresholds. In some cases, the number of multiple transmission instances are a number of multiple uplink transmission instances.

In some cases, the first network node 405-f may receive control information indicative of a first TRP associated with the first set of transmission instances and a second TRP associated with the second set of transmission instances, and the first network node 405-f may determine the first spatial filter based on the first TRP being associated with the first set of transmission instances and the second spatial filter based on the second TRP being associated with the second set of transmission instances. In some cases, the second set of transmission instances includes a different number of transmission instances than the first set of transmission instances. In some cases, the first network node 405-f may: receive one or more first reference signals from the first TRP, receive one or more second reference signals from the second TRP; and transmit control information to the second network node 405-g indicating measurement information for the one or more first reference signals and the one or more second reference signals, and the control information may be based on the measurement information.

In some cases, communicating the scheduling information at 705 may include transmitting, from the first network node 405-f to the second network node 405-g, scheduling information that configures the second network node 405-g to receive the number of multiple transmission instances. In some cases, the first network node 405-f may transmit control information indicative of a first TCI state associated with the first set of transmission instances and a second TCI state associated with the second set of transmission instances. The first network node 405-f may determine the first spatial filter based on the first TCI state, and the first network node 405-f may determine the second spatial filter based on the second TCI state. In some cases, the first network node 405-f may transmit, to the second network node 405-g, one or more reference signals, and receive, from the second network node 405-g, measurement information for the one or more reference signals. The second TCI state may be based on the measurement information. In some cases, the number of multiple transmission instances is a number of multiple sidelink transmission instances. In some cases, the number of multiple transmission instances is a set of downlink transmission instances.

In some cases, where the first network node 405-f is different from the third network node 405-h that performs energy harvesting on the second set of transmission instances, the first network node 405-f may transmit the first set of transmission instances using the first spatial filter and a first transmission power level and the first network node 405-f may transmit the second set of transmission instances using the second spatial filter and a second transmission power level different than the first transmission power level. For example, the second transmission power level may be higher than the first transmission power level to convey more energy to the third network node 405-h.

In some cases, the first network node 405-f may transmit, to the second network node 405-g, first control information indicative of a first QCL relationship associated with the first spatial filter; and the first network node 405-f may transmit, to the third network node 405-h, second control information indicative of a second QCL relationship associated with the second spatial filter.

In some cases, the first network node 405-f may harvest energy from the second set of transmission instances (e.g., the first network node 405-f may be a same UE 115 as the third network node 405-h).

Figure 8:
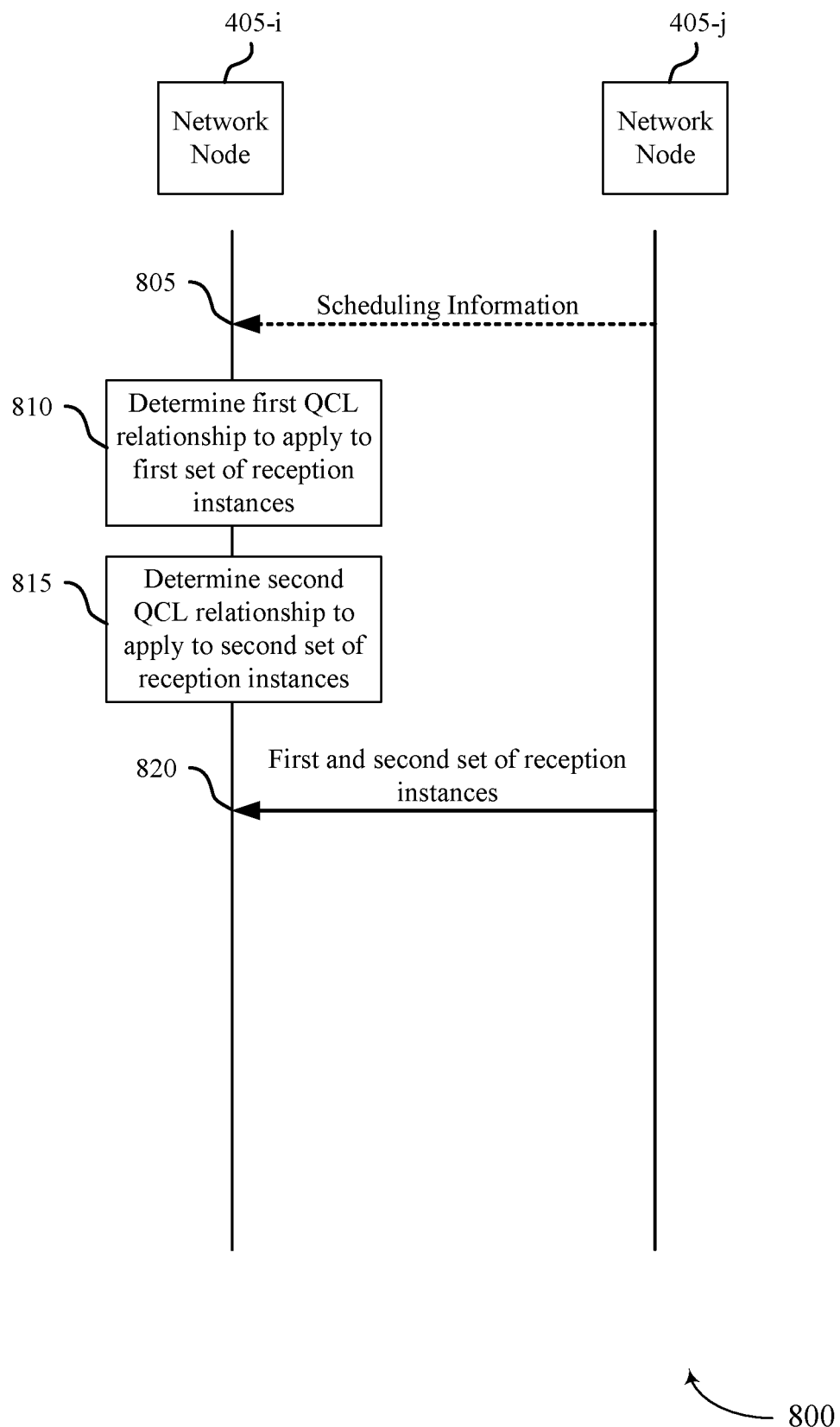
FIG. 8 illustrates an example of a process flow that supports management of transmission instances for energy harvesting devices in accordance with one or more aspects of the present disclosure.

FIG. 8 illustrates an example of a process flow 800 that supports management of transmission instances for energy harvesting devices in accordance with one or more aspects of the present disclosure. The process flow 800 may include a first network node 405-i and a second network node 405-j. In the following description of the process flow 800, the operations between the first network node 405-i and the second network node 405-j may be transmitted in a different order than the example order shown, or the operations performed by the first network node 405-i and the second network node 405-j may be performed in different orders or at different times. Some operations may also be omitted from the process flow 800, and other operations may be added to the process flow 800.

In some cases, at 805, the first network node 405-i may receive scheduling information that configures the first network node 405-i to receive a number of multiple reception instances of a data communication.

At 810, the first network node 405-i may determine a first QCL relationship to apply to a first set of reception instances of the number of multiple reception instances of the data communication, where the first set of reception instances is configured to provide the data communication from the second network node 405-j.

At 815, the first network node 405-i may determine a second QCL relationship to apply to a second set of reception instances of the number of multiple reception instances of the data communication, where the second set of reception instances is configured to allow harvesting of energy from the data communication by the first network node 405-i.

At 820, the first network node 405-i may receive, from the second network node 405-j, the first set of reception instances using the first QCL relationship and the second set of reception instances using the second QCL relationship.

In some cases, the first network node 405-i may receive, from the second network node 405-j, control information indicative of the first QCL relationship to apply for the first set of reception instances and the second QCL relationship to apply for the second set of reception instances.

In some cases, the first network node 405-i may receive, from the second network node 405-j, one or more reference signals; and the first network node 405-i may transmit control information to the second network node 405-j indicating measurement information for the one or more reference signals, and the second QCL relationship may be based on the measurement information.

In some cases, the first network node 405-i may receive, from the second network node 405-j, control information indicative of a first TRP associated with the first set of reception instances and a second TRP associated with the second set of reception instances. The first network node 405-i may determine the first QCL relationship based on the first TRP being associated with the first set of reception instances, and the first network node 405-i may determine the second QCL relationship based on the second TRP being associated with the second set of reception instances. In some cases, the first network node 405-i may: receive one or more first reference signals from the first TRP; receive one or more second reference signals from the second TRP, and transmit second control information to the second network node indicating measurement information for the one or more first reference signals and the one or more second reference signals, and the control information may be based on the measurement information.

In some cases, the number of multiple reception instances is a number of multiple sidelink transmission instances. In some cases, the number of multiple reception instances is a number of downlink transmission instances.

In some cases, the first network node 405-i may harvest energy from the second set of reception instances.

In some cases, the first network node 405-i may receive the data communication via the first set of reception instances and the second set of reception instances.

Figure 9:
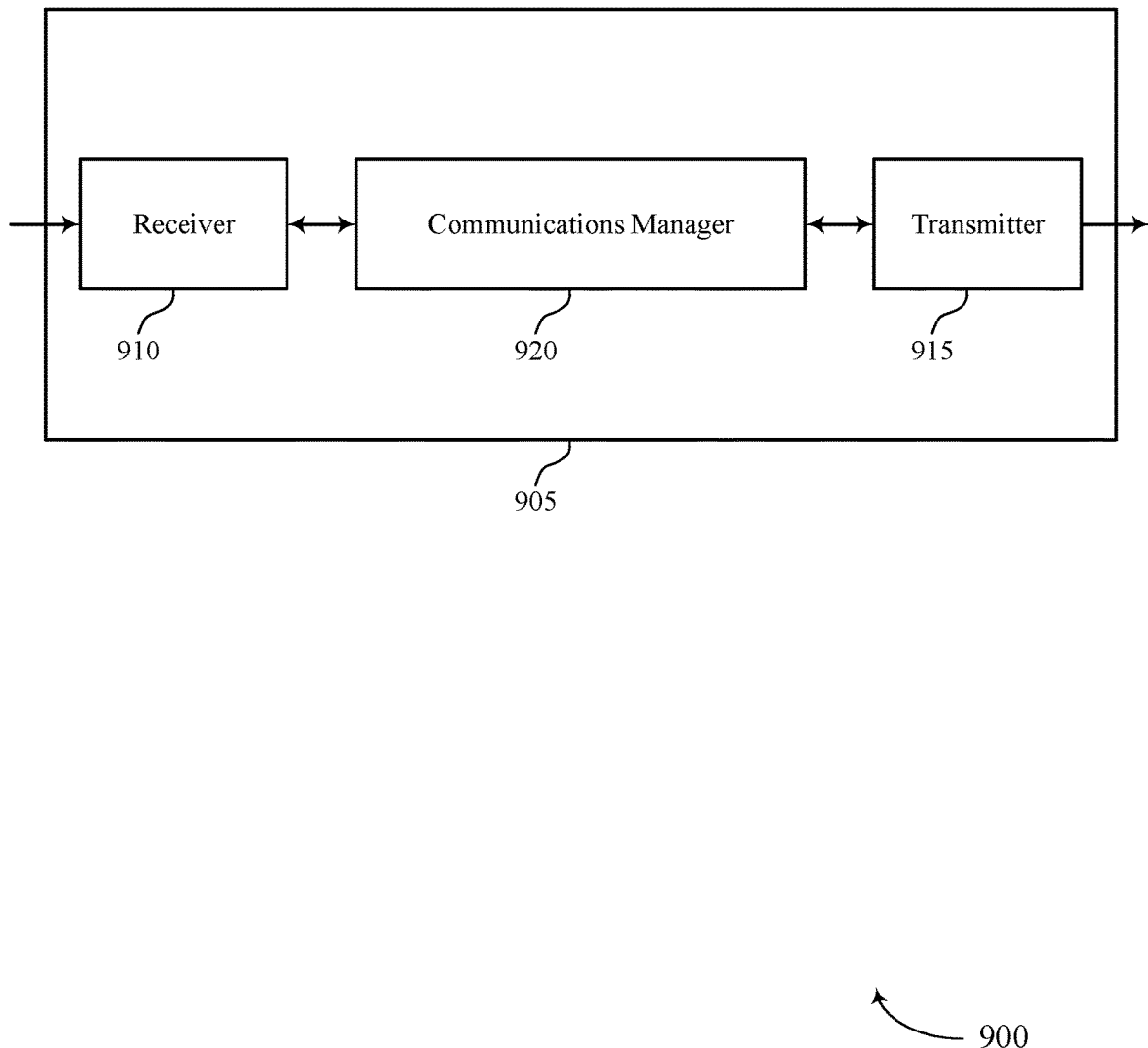
FIGS. 9 and 10 show block diagrams of devices that support management of transmission instances for energy harvesting devices in accordance with one or more aspects of the present disclosure.

FIG. 9 shows a block diagram 900 of a device 905 that supports management of transmission instances for energy harvesting devices in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to management of transmission instances for energy harvesting devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to management of transmission instances for energy harvesting devices). In some aspects, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of management of transmission instances for energy harvesting devices as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first network node in accordance with examples as disclosed herein. For example, the communications manager 920 may be configured as or otherwise support a means for determining a first spatial filter to apply to a first set of transmission instances of a set of multiple transmission instances of a data communication, where the first set of transmission instances is configured to provide the data communication to a second network node. The communications manager 920 may be configured as or otherwise support a means for determining a second spatial filter to apply to a second set of transmission instances of the set of multiple transmission instances, where the second set of transmission instances is configured to allow harvesting of energy from the data communication by a third network node. The communications manager 920 may be configured as or otherwise support a means for transmitting the first set of transmission instances using the first spatial filter and the second set of transmission instances using the second spatial filter.

Additionally, or alternatively, the communications manager 920 may support wireless communications at a first network node in accordance with examples as disclosed herein. For example, the communications manager 920 may be configured as or otherwise support a means for determining a first QCL relationship to apply to a first set of reception instances of a set of multiple reception instances of a data communication, where the first set of reception instances is configured to provide the data communication from a second network node. The communications manager 920 may be configured as or otherwise support a means for determining a second QCL relationship to apply to a second set of reception instances of the set of multiple reception instances, where the second set of reception instances is configured to allow harvesting of energy from the data communication by the first network node. The communications manager 920 may be configured as or otherwise support a means for receiving the first set of reception instances using the first QCL relationship and the second set of reception instances using the second QCL relationship.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources by enabling beam management for transmission instances for energy harvesting purposes.

Figure 10:
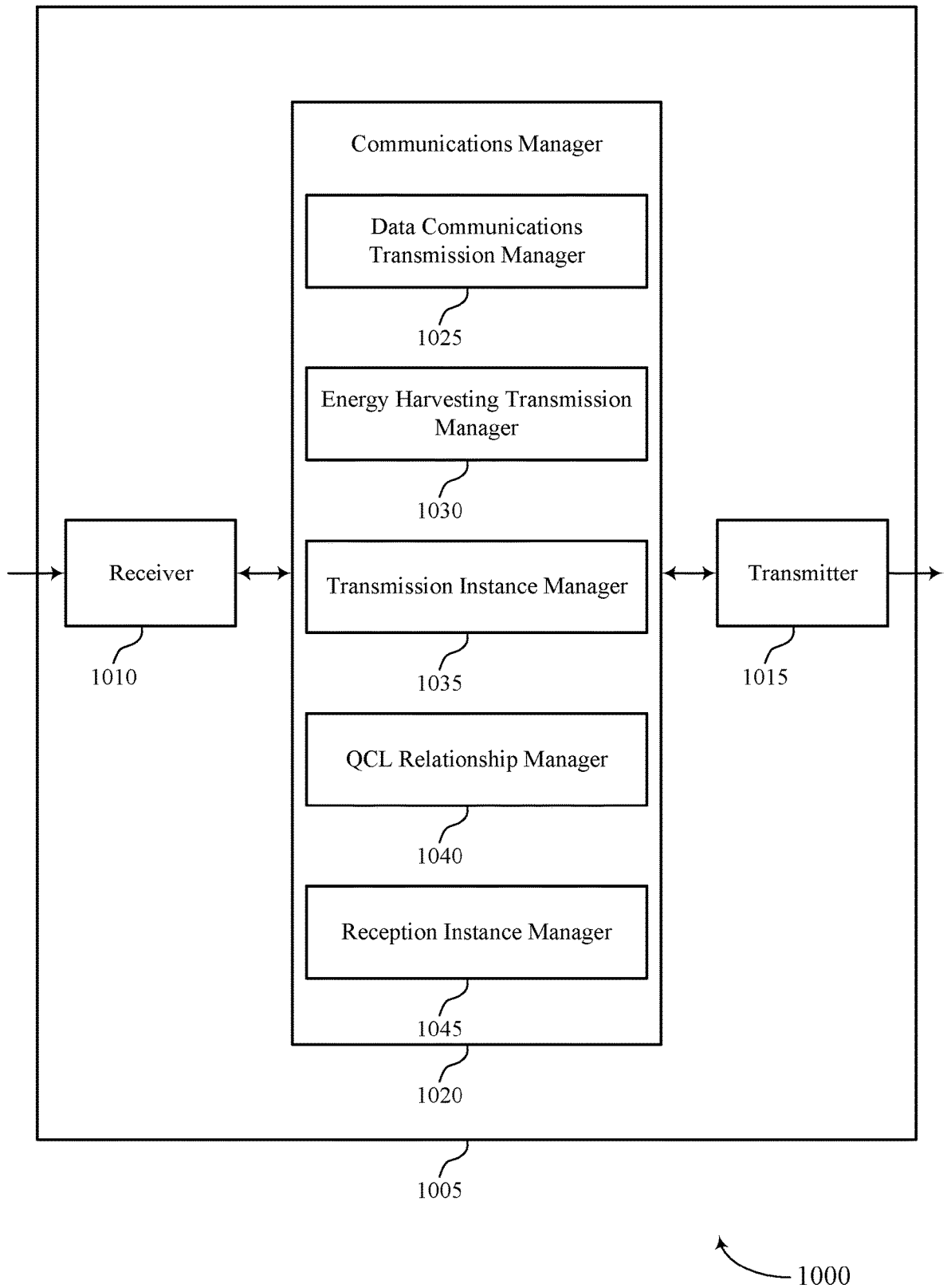

FIG. 10 shows a block diagram 1000 of a device 1005 that supports management of transmission instances for energy harvesting devices in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to management of transmission instances for energy harvesting devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to management of transmission instances for energy harvesting devices). In some aspects, the transmitter 1015 may be co-located with a receiver 1010 in a transceiver module. The transmitter 1015 may utilize a single antenna or a set of multiple antennas.

The device 1005, or various components thereof, may be an example of means for performing various aspects of management of transmission instances for energy harvesting devices as described herein. For example, the communications manager 1020 may include a data communications transmission manager 1025, an energy harvesting transmission manager 1030, a transmission instance manager 1035, a QCL relationship manager 1040, a reception instance manager 1045, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network node in accordance with examples as disclosed herein. The data communications transmission manager 1025 may be configured as or otherwise support a means for determining a first spatial filter to apply to a first set of transmission instances of a set of multiple transmission instances of a data communication, where the first set of transmission instances is configured to provide the data communication to a second network node. The energy harvesting transmission manager 1030 may be configured as or otherwise support a means for determining a second spatial filter to apply to a second set of transmission instances of the set of multiple transmission instances, where the second set of transmission instances is configured to allow harvesting of energy from the data communication by a third network node. The transmission instance manager 1035 may be configured as or otherwise support a means for transmitting the first set of transmission instances using the first spatial filter and the second set of transmission instances using the second spatial filter.

Additionally, or alternatively, the communications manager 1020 may support wireless communications at a first network node in accordance with examples as disclosed herein. The QCL relationship manager 1040 may be configured as or otherwise support a means for determining a first QCL relationship to apply to a first set of reception instances of a set of multiple reception instances of a data communication, where the first set of reception instances is configured to provide the data communication from a second network node. The QCL relationship manager 1040 may be configured as or otherwise support a means for determining a second QCL relationship to apply to a second set of reception instances of the set of multiple reception instances, where the second set of reception instances is configured to allow harvesting of energy from the data communication by the first network node. The reception instance manager 1045 may be configured as or otherwise support a means for receiving the first set of reception instances using the first QCL relationship and the second set of reception instances using the second QCL relationship.

Figure 11:
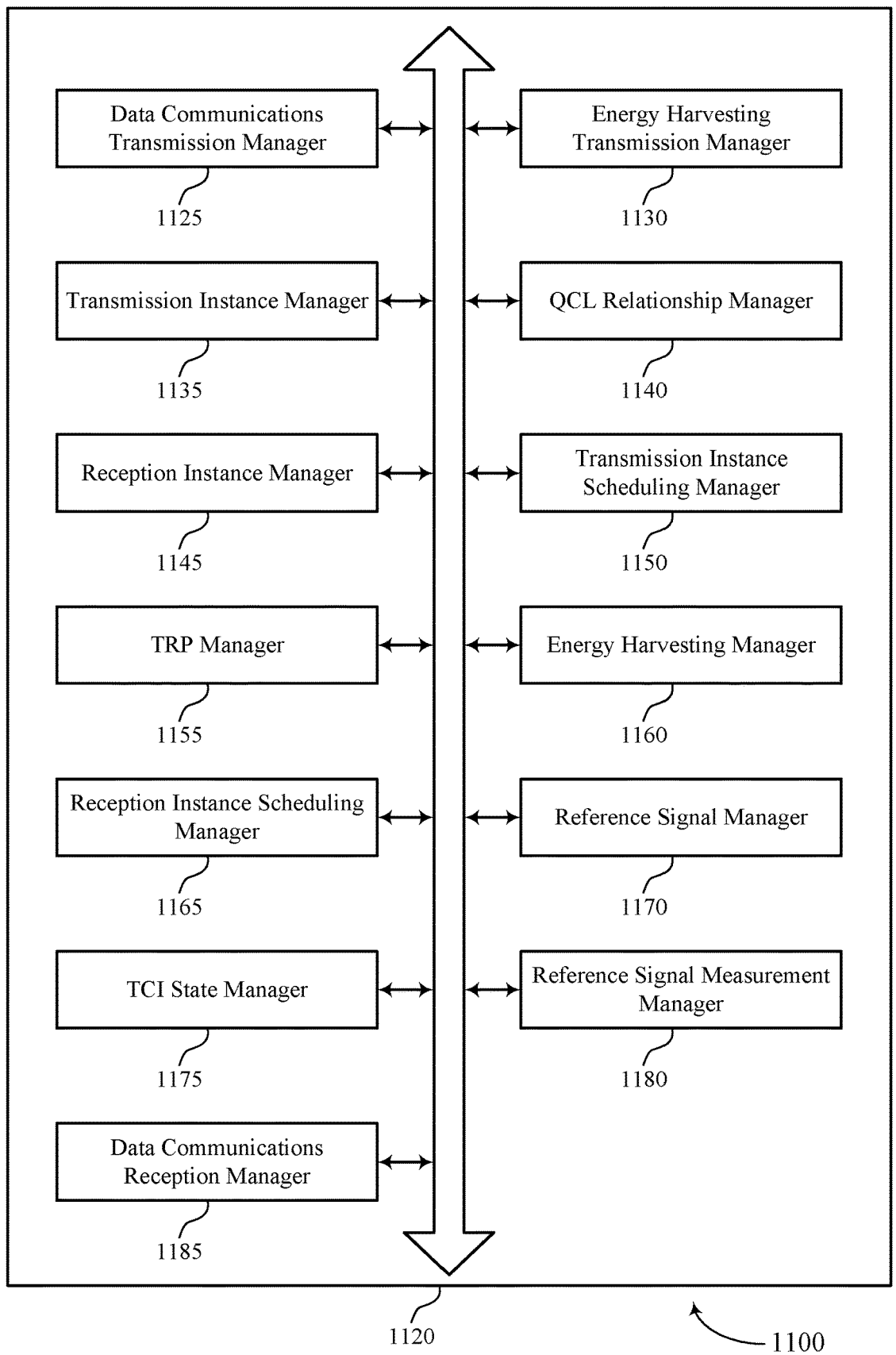
FIG. 11 shows a block diagram of a communications manager that supports management of transmission instances for energy harvesting devices in accordance with one or more aspects of the present disclosure.

FIG. 11 shows a block diagram 1100 of a communications manager 1120 that supports management of transmission instances for energy harvesting devices in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of management of transmission instances for energy harvesting devices as described herein. For example, the communications manager 1120 may include a data communications transmission manager 1125, an energy harvesting transmission manager 1130, a transmission instance manager 1135, a QCL relationship manager 1140, a reception instance manager 1145, a transmission instance scheduling manager 1150, an TRP manager 1155, an energy harvesting manager 1160, a reception instance scheduling manager 1165, a reference signal manager 1170, a TCI state manager 1175, a reference signal measurement manager 1180, a data communications reception manager 1185, or any combination thereof. Each of these components may communicate, directly or indirectly, with one another (e.g., via one or more buses).

The communications manager 1120 may support wireless communications at a first network node in accordance with examples as disclosed herein. The data communications transmission manager 1125 may be configured as or otherwise support a means for determining a first spatial filter to apply to a first set of transmission instances of a set of multiple transmission instances of a data communication, where the first set of transmission instances is configured to provide the data communication to a second network node. The energy harvesting transmission manager 1130 may be configured as or otherwise support a means for determining a second spatial filter to apply to a second set of transmission instances of the set of multiple transmission instances, where the second set of transmission instances is configured to allow harvesting of energy from the data communication by a third network node. The transmission instance manager 1135 may be configured as or otherwise support a means for transmitting the first set of transmission instances using the first spatial filter and the second set of transmission instances using the second spatial filter.

In some aspects, the transmission instance scheduling manager 1150 may be configured as or otherwise support a means for receiving scheduling information that configures the first network node to receive the set of multiple transmission instances.

In some aspects, the TCI state manager 1175 may be configured as or otherwise support a means for receiving control information indicative of a first TCI state associated with the first set of transmission instances and a second TCI state associated with the second set of transmission instances, where determining the first spatial filter is based on the first TCI state, and where determining the second spatial filter is based on the second TCI state.

In some aspects, the QCL relationship manager 1140 may be configured as or otherwise support a means for transmitting second control information indicative of a QCL relationship for energy harvesting at the first network node, where the second TCI state is based on the second control information.

In some aspects, the reference signal manager 1170 may be configured as or otherwise support a means for receiving one or more reference signals from the second network node. In some aspects, the QCL relationship manager 1140 may be configured as or otherwise support a means for identifying the QCL relationship for harvesting of energy at the first network node based on measurement information corresponding to the one or more reference signals, where the third network node is the first network node.

In some aspects, the measurement information includes charging rate information for harvesting of energy associated with the one or more reference signals.

In some aspects, the reference signal manager 1170 may be configured as or otherwise support a means for receiving one or more reference signals from the second network node. In some aspects, the TCI state manager 1175 may be configured as or otherwise support a means for transmitting second control information to the second network node indicating measurement information for the one or more reference signals, where the second TCI state is based on the measurement information.

In some aspects, the measurement information includes, for the one or more reference signals, at least one of an SINR, an RSRP, an RSRQ, or charging rate information that pertains to harvesting of energy.

In some aspects, the charging rate information that pertains to harvesting of energy includes a one bit or multi-bit indicator of charging rate sufficiency based on one or more thresholds.

In some aspects, the set of multiple transmission instances include a set of multiple uplink transmission repetitions.

In some aspects, the TRP manager 1155 may be configured as or otherwise support a means for receiving control information indicative of a first TRP associated with the first set of transmission instances and a second TRP associated with the second set of transmission instances, where determining the first spatial filter is based on the first TRP being associated with the first set of transmission instances, and where determining the second spatial filter is based on the second TRP being associated with the second set of transmission instances.

In some aspects, the second set of transmission instances includes a different number of transmission instances than the first set of transmission instances.

In some aspects, the reference signal manager 1170 may be configured as or otherwise support a means for receiving one or more first reference signals from the first TRP. In some aspects, the reference signal manager 1170 may be configured as or otherwise support a means for receiving one or more second reference signals from the second TRP. In some aspects, the reference signal measurement manager 1180 may be configured as or otherwise support a means for transmitting second control information to the second network node indicating measurement information for the one or more first reference signals and the one or more second reference signals, where the control information is based on the measurement information.

In some aspects, the transmission instance scheduling manager 1150 may be configured as or otherwise support a means for transmitting, to the second network node, scheduling information that configures the second network node to receive the set of multiple transmission instances.

In some aspects, the TCI state manager 1175 may be configured as or otherwise support a means for transmitting control information indicative of a first TCI state associated with the first set of transmission instances and a second TCI state associated with the second set of transmission instances, where determining the first spatial filter is based on the first TCI state, and where determining the second spatial filter is based on the second TCI state.

In some aspects, the reference signal manager 1170 may be configured as or otherwise support a means for transmitting, to the second network node, one or more reference signals. In some aspects, the TCI state manager 1175 may be configured as or otherwise support a means for receiving, from the second network node, measurement information for the one or more reference signals, where the second TCI state is based on the measurement information.

In some aspects, the set of multiple transmission instances is a set of multiple sidelink transmission instances.

In some aspects, the set of multiple transmission instances is a set of multiple downlink transmission instances.

In some aspects, the transmission instance manager 1135 may be configured as or otherwise support a means for transmitting the first set of transmission instances using a first power level and transmitting the second set of transmission instances using a second power level different than the first power level.

In some aspects, the QCL relationship manager 1140 may be configured as or otherwise support a means for transmitting, to the second network node, first control information indicative of a first QCL relationship associated with the first spatial filter. In some aspects, the QCL relationship manager 1140 may be configured as or otherwise support a means for transmitting, to the third network node, second control information indicative of a second QCL relationship associated with the second spatial filter.

In some aspects, the energy harvesting manager 1160 may be configured as or otherwise support a means for harvesting energy from the second set of transmission instances, where the third network node is the first network node.

Additionally, or alternatively, the communications manager 1120 may support wireless communications at a first network node in accordance with examples as disclosed herein. The QCL relationship manager 1140 may be configured as or otherwise support a means for determining a first QCL relationship to apply to a first set of reception instances of a set of multiple reception instances of a data communication, where the first set of reception instances is configured to provide the data communication from a second network node. In some aspects, the QCL relationship manager 1140 may be configured as or otherwise support a means for determining a second QCL relationship to apply to a second set of reception instances of the set of multiple reception instances, where the second set of reception instances is configured to allow harvesting of energy from the data communication by the first network node. The reception instance manager 1145 may be configured as or otherwise support a means for receiving the first set of reception instances using the first QCL relationship and the second set of reception instances using the second QCL relationship.

In some aspects, the reception instance scheduling manager 1165 may be configured as or otherwise support a means for receiving scheduling information that configures the first network node to receive the set of multiple reception instances.

In some aspects, the QCL relationship manager 1140 may be configured as or otherwise support a means for receiving control information indicative of the first QCL relationship to apply for the first set of reception instances and the second QCL relationship to apply for the second set of reception instances.

In some aspects, the reference signal manager 1170 may be configured as or otherwise support a means for receiving one or more reference signals from the second network node. In some aspects, the QCL relationship manager 1140 may be configured as or otherwise support a means for transmitting second control information to the second network node indicating measurement information for the one or more reference signals, where the second QCL relationship is based on the measurement information.

In some aspects, the TRP manager 1155 may be configured as or otherwise support a means for receiving control information indicative of a first TRP associated with the first set of reception instances and a second TRP associated with the second set of reception instances, where determining the first QCL relationship is based on the first TRP being associated with the first set of reception instances, and where determining the second QCL relationship is based on the second TRP being associated with the second set of reception instances.

In some aspects, the reference signal manager 1170 may be configured as or otherwise support a means for receiving one or more first reference signals from the first TRP. In some aspects, the reference signal manager 1170 may be configured as or otherwise support a means for receiving one or more second reference signals from the second TRP. In some aspects, the reference signal measurement manager 1180 may be configured as or otherwise support a means for transmitting second control information to the second network node indicating measurement information for the one or more first reference signals and the one or more second reference signals, where the control information is based on the measurement information.

In some aspects, the set of multiple reception instances is a set of multiple downlink reception instances.

In some aspects, the set of multiple reception instances is a set of multiple sidelink reception instances.

In some aspects, the energy harvesting manager 1160 may be configured as or otherwise support a means for harvesting energy from the second set of reception instances.

In some aspects, the data communications reception manager 1185 may be configured as or otherwise support a means for receiving the data communication via the first set of reception instances and the second set of reception instances.

Figure 12:
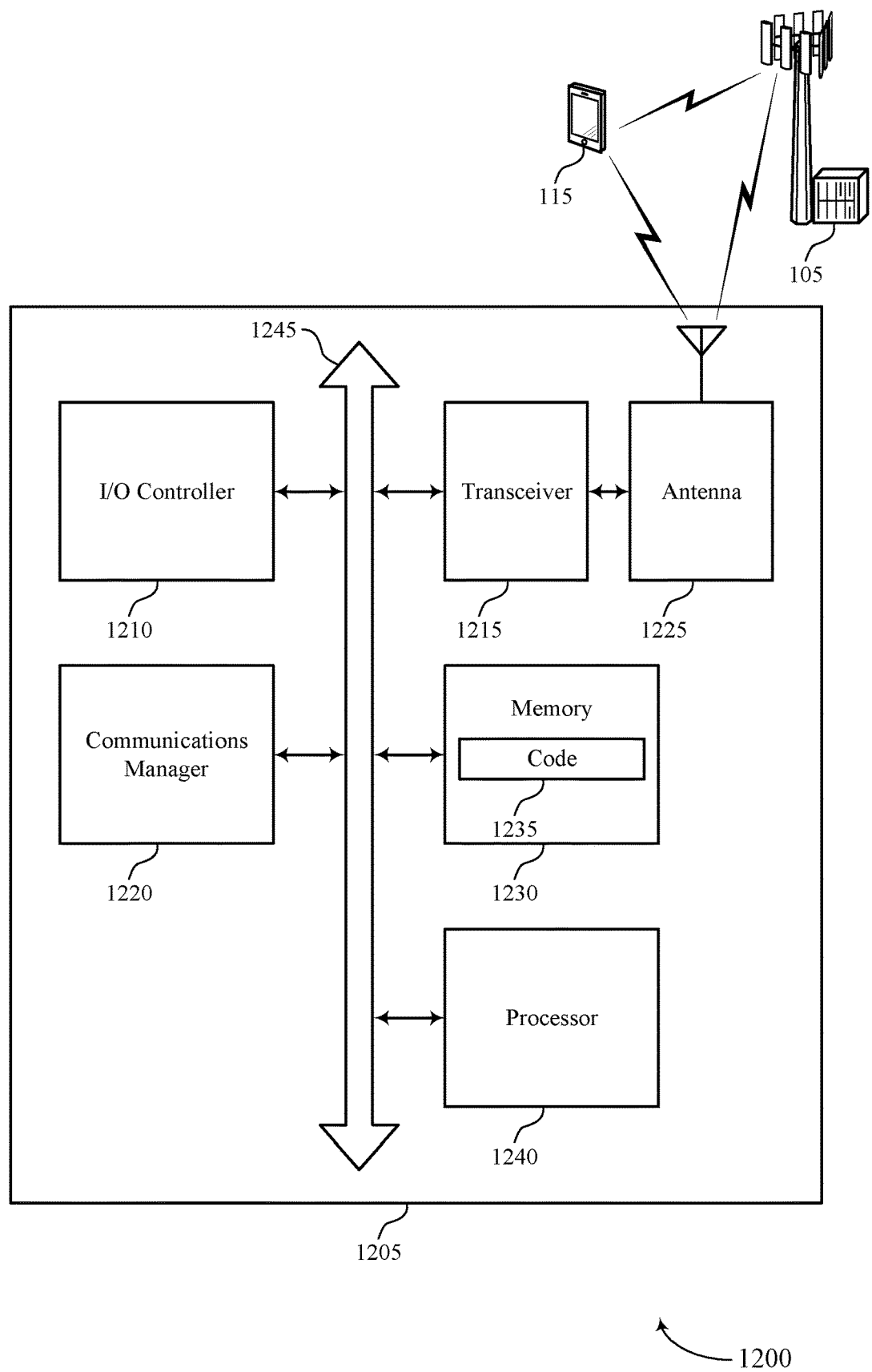
FIG. 12 shows a diagram of a system including a device that supports management of transmission instances for energy harvesting devices in accordance with one or more aspects of the present disclosure.

FIG. 12 shows a diagram of a system 1200 including a device 1205 that supports management of transmission instances for energy harvesting devices in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting management of transmission instances for energy harvesting devices). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a first network node in accordance with examples as disclosed herein. For example, the communications manager 1220 may be configured as or otherwise support a means for determining a first spatial filter to apply to a first set of transmission instances of a set of multiple transmission instances of a data communication, where the first set of transmission instances is configured to provide the data communication to a second network node. The communications manager 1220 may be configured as or otherwise support a means for determining a second spatial filter to apply to a second set of transmission instances of the set of multiple transmission instances, where the second set of transmission instances is configured to allow harvesting of energy from the data communication by a third network node. The communications manager 1220 may be configured as or otherwise support a means for transmitting the first set of transmission instances using the first spatial filter and the second set of transmission instances using the second spatial filter.

Additionally, or alternatively, the communications manager 1220 may support wireless communications at a first network node in accordance with examples as disclosed herein. For example, the communications manager 1220 may be configured as or otherwise support a means for determining a first QCL relationship to apply to a first set of reception instances of a set of multiple reception instances of a data communication, where the first set of reception instances is configured to provide the data communication from a second network node. The communications manager 1220 may be configured as or otherwise support a means for determining a second QCL relationship to apply to a second set of reception instances of the set of multiple reception instances, where the second set of reception instances is configured to allow harvesting of energy from the data communication by the first network node. The communications manager 1220 may be configured as or otherwise support a means for receiving the first set of reception instances using the first QCL relationship and the second set of reception instances using the second QCL relationship.

By including or configuring the communications manager 1220 in accordance with examples as described herein, the device 1205 may support techniques for more efficient utilization of communication resources, improved coordination between devices, and longer battery life by enabling beam management for transmission instances for energy harvesting purposes.

In some aspects, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some aspects, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of management of transmission instances for energy harvesting devices as described herein, or the processor 1240 and the memory 1230 may be otherwise configured to perform or support such operations.

Figure 13:
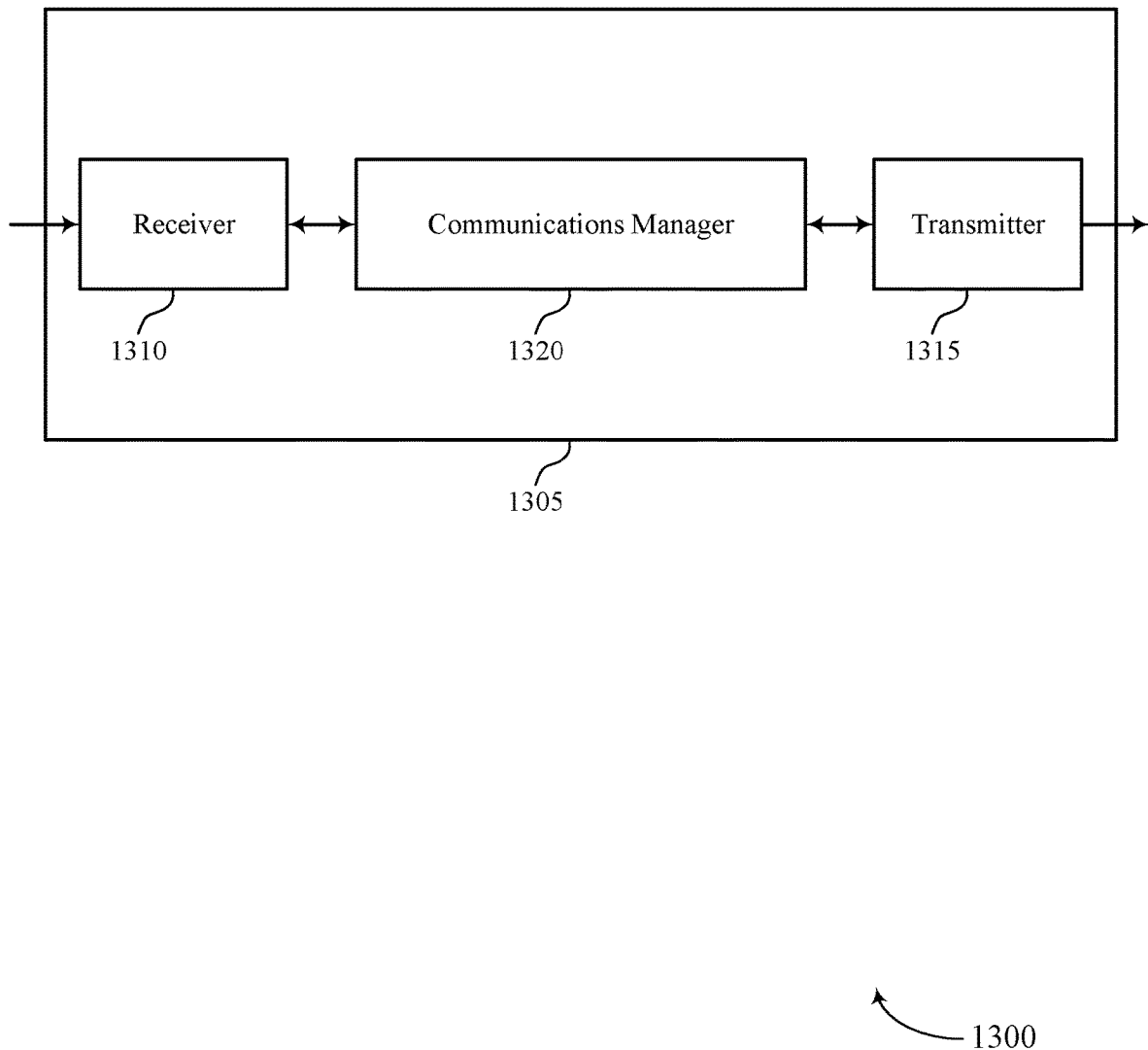
FIGS. 13 and 14 show block diagrams of devices that support management of transmission instances for energy harvesting devices in accordance with one or more aspects of the present disclosure.

FIG. 13 shows a block diagram 1300 of a device 1305 that supports management of transmission instances for energy harvesting devices in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some aspects, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some aspects, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of management of transmission instances for energy harvesting devices as described herein. For example, the communications manager 1320, the receiver 1310, the transmitter 1315, or various combinations or components thereof may support a method for performing one or more of the functions described herein.

In some aspects, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a first network node in accordance with examples as disclosed herein. For example, the communications manager 1320 may be configured as or otherwise support a means for determining a first spatial filter to apply to a first set of transmission instances of a set of multiple transmission instances of a data communication, where the first set of transmission instances is configured to provide the data communication to a second network node. The communications manager 1320 may be configured as or otherwise support a means for determining a second spatial filter to apply to a second set of transmission instances of the set of multiple transmission instances, where the second set of transmission instances is configured to allow harvesting of energy from the data communication by a third network node. The communications manager 1320 may be configured as or otherwise support a means for transmitting the first set of transmission instances using the first spatial filter and the second set of transmission instances using the second spatial filter.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for more efficient utilization of communication resources by enabling beam management for transmission instances for energy harvesting purposes.

Figure 14:
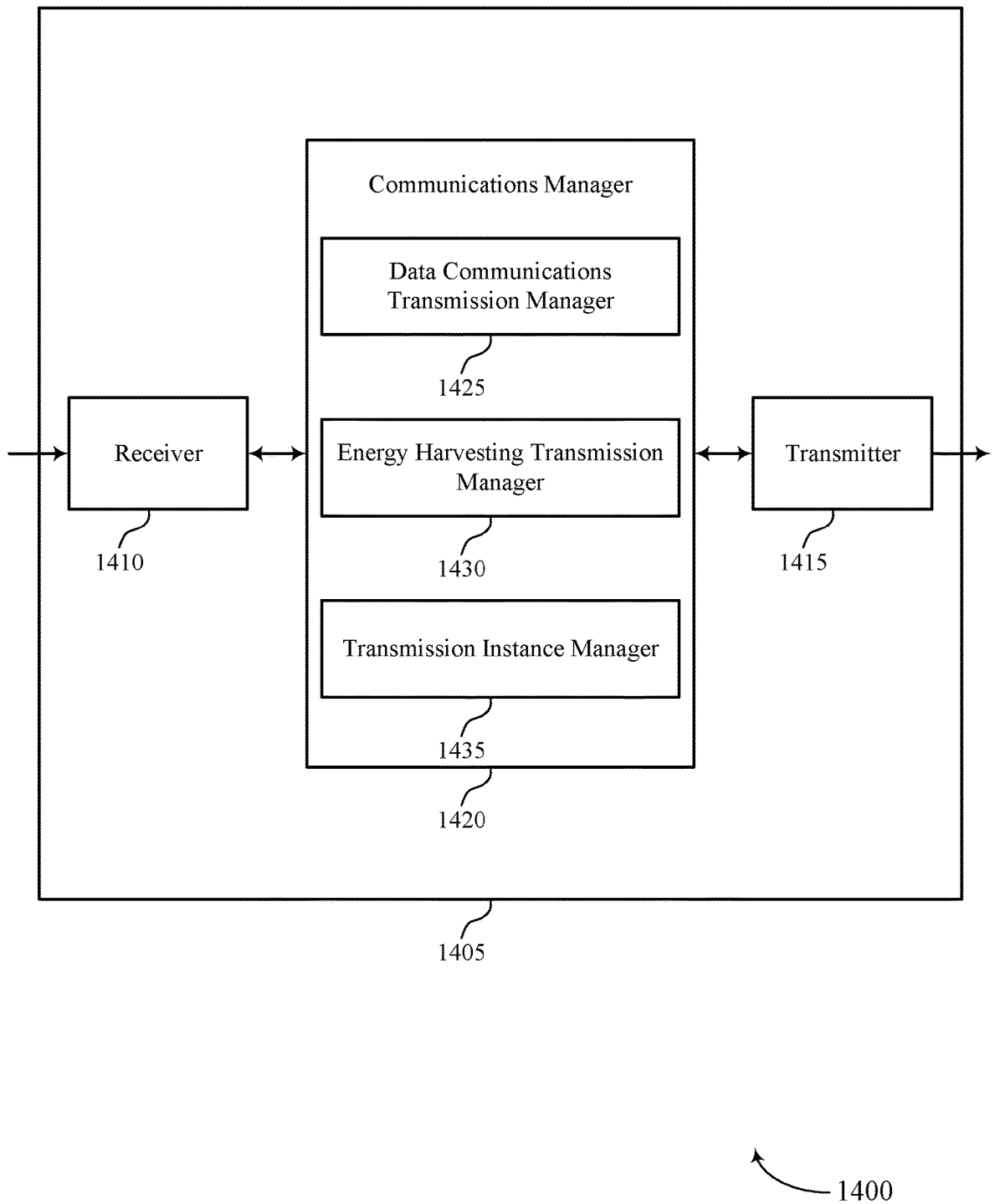

FIG. 14 shows a block diagram 1400 of a device 1405 that supports management of transmission instances for energy harvesting devices in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some aspects, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some aspects, the transmitter 1415 and the receiver 1410 may be co-located in a transceiver, which may include or be coupled with a modem.

The device 1405, or various components thereof, may be an example of means for performing various aspects of management of transmission instances for energy harvesting devices as described herein. For example, the communications manager 1420 may include a data communications transmission manager 1425, an energy harvesting transmission manager 1430, a transmission instance manager 1435, or any combination thereof. The communications manager 1420 may be an example of aspects of a communications manager 1320 as described herein. In some aspects, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a first network node in accordance with examples as disclosed herein. The data communications transmission manager 1425 may be configured as or otherwise support a means for determining a first spatial filter to apply to a first set of transmission instances of a set of multiple transmission instances of a data communication, where the first set of transmission instances is configured to provide the data communication to a second network node. The energy harvesting transmission manager 1430 may be configured as or otherwise support a means for determining a second spatial filter to apply to a second set of transmission instances of the set of multiple transmission instances, where the second set of transmission instances is configured to allow harvesting of energy from the data communication by a third network node. The transmission instance manager 1435 may be configured as or otherwise support a means for transmitting the first set of transmission instances using the first spatial filter and the second set of transmission instances using the second spatial filter.

Figure 15:
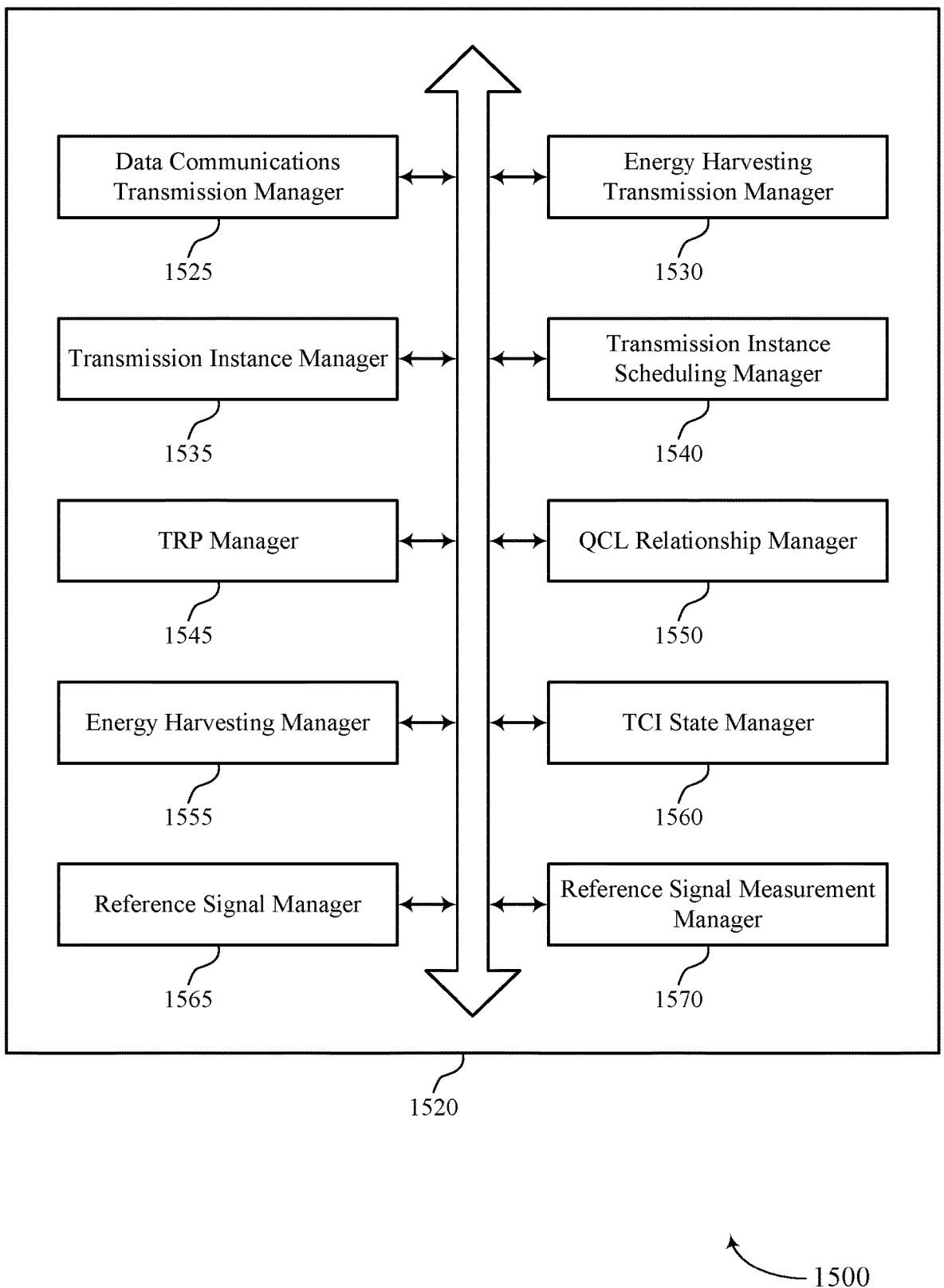
FIG. 15 shows a block diagram of a communications manager that supports management of transmission instances for energy harvesting devices in accordance with one or more aspects of the present disclosure.

FIG. 15 shows a block diagram 1500 of a communications manager 1520 that supports management of transmission instances for energy harvesting devices in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of management of transmission instances for energy harvesting devices as described herein. For example, the communications manager 1520 may include a data communications transmission manager 1525, an energy harvesting transmission manager 1530, a transmission instance manager 1535, a transmission instance scheduling manager 1540, an TRP manager 1545, a QCL relationship manager 1550, an energy harvesting manager 1555, a TCI state manager 1560, a reference signal manager 1565, a reference signal measurement manager 1570, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a first network node in accordance with examples as disclosed herein. The data communications transmission manager 1525 may be configured as or otherwise support a means for determining a first spatial filter to apply to a first set of transmission instances of a set of multiple transmission instances of a data communication, where the first set of transmission instances is configured to provide the data communication to a second network node. The energy harvesting transmission manager 1530 may be configured as or otherwise support a means for determining a second spatial filter to apply to a second set of transmission instances of the set of multiple transmission instances, where the second set of transmission instances is configured to allow harvesting of energy from the data communication by a third network node. The transmission instance manager 1535 may be configured as or otherwise support a means for transmitting the first set of transmission instances using the first spatial filter and the second set of transmission instances using the second spatial filter.

In some aspects, the transmission instance scheduling manager 1540 may be configured as or otherwise support a means for receiving scheduling information that configures the first network node to receive the set of multiple transmission instances.

In some aspects, the TCI state manager 1560 may be configured as or otherwise support a means for receiving control information indicative of a first TCI state associated with the first set of transmission instances and a second TCI state associated with the second set of transmission instances, where determining the first spatial filter is based on the first TCI state, and where determining the second spatial filter is based on the second TCI state.

In some aspects, the QCL relationship manager 1550 may be configured as or otherwise support a means for transmitting second control information indicative of a QCL relationship for energy harvesting at the first network node, where the second TCI state is based on the second control information.

In some aspects, the reference signal manager 1565 may be configured as or otherwise support a means for receiving one or more reference signals from the second network node. In some aspects, the QCL relationship manager 1550 may be configured as or otherwise support a means for identifying the QCL relationship for harvesting of energy at the first network node based on measurement information corresponding to the one or more reference signals, where the third network node is the first network node.

In some aspects, the measurement information includes charging rate information for harvesting of energy associated with the one or more reference signals.

In some aspects, the reference signal manager 1565 may be configured as or otherwise support a means for receiving one or more reference signals from the second network node. In some aspects, the TCI state manager 1560 may be configured as or otherwise support a means for transmitting second control information to the second network node indicating measurement information for the one or more reference signals, where the second TCI state is based on the measurement information.

In some aspects, the measurement information includes, for the one or more reference signals, at least one of an SINR, an RSRP, an RSRQ, or charging rate information that pertains to harvesting of energy.

In some aspects, the charging rate information that pertains to harvesting of energy includes a one bit or multi-bit indicator of charging rate sufficiency based on one or more thresholds.

In some aspects, the set of multiple transmission instances include a set of multiple uplink transmission repetitions.

In some aspects, the TRP manager 1545 may be configured as or otherwise support a means for receiving control information indicative of a first TRP associated with the first set of transmission instances and a second TRP associated with the second set of transmission instances, where determining the first spatial filter is based on the first TRP being associated with the first set of transmission instances, and where determining the second spatial filter is based on the second TRP being associated with the second set of transmission instances.

In some aspects, the second set of transmission instances includes a different number of transmission instances than the first set of transmission instances.

In some aspects, the reference signal manager 1565 may be configured as or otherwise support a means for receiving one or more first reference signals from the first TRP. In some aspects, the reference signal manager 1565 may be configured as or otherwise support a means for receiving one or more second reference signals from the second TRP. In some aspects, the reference signal measurement manager 1570 may be configured as or otherwise support a means for transmitting second control information to the second network node indicating measurement information for the one or more first reference signals and the one or more second reference signals, where the control information is based on the measurement information.

In some aspects, the transmission instance scheduling manager 1540 may be configured as or otherwise support a means for transmitting, to the second network node, scheduling information that configures the second network node to receive the set of multiple transmission instances.

In some aspects, the TCI state manager 1560 may be configured as or otherwise support a means for transmitting control information indicative of a first TCI state associated with the first set of transmission instances and a second TCI state associated with the second set of transmission instances, where determining the first spatial filter is based on the first TCI state, and where determining the second spatial filter is based on the second TCI state.

In some aspects, the reference signal manager 1565 may be configured as or otherwise support a means for transmitting, to the second network node, one or more reference signals. In some aspects, the TCI state manager 1560 may be configured as or otherwise support a means for receiving, from the second network node, measurement information for the one or more reference signals, where the second TCI state is based on the measurement information.

In some aspects, the set of multiple transmission instances is a set of multiple downlink transmission instances.

In some aspects, the transmission instance manager 1535 may be configured as or otherwise support a means for transmitting the first set of transmission instances using a first power level and transmitting the second set of transmission instances using a second power level different than the first power level.

In some aspects, the QCL relationship manager 1550 may be configured as or otherwise support a means for transmitting, to the second network node, first control information indicative of a first QCL relationship associated with the first spatial filter. In some aspects, the QCL relationship manager 1550 may be configured as or otherwise support a means for transmitting, to the third network node, second control information indicative of a second QCL relationship associated with the second spatial filter.

In some aspects, the energy harvesting manager 1555 may be configured as or otherwise support a means for harvesting energy from the second set of transmission instances, where the third network node is the first network node.

Figure 16:
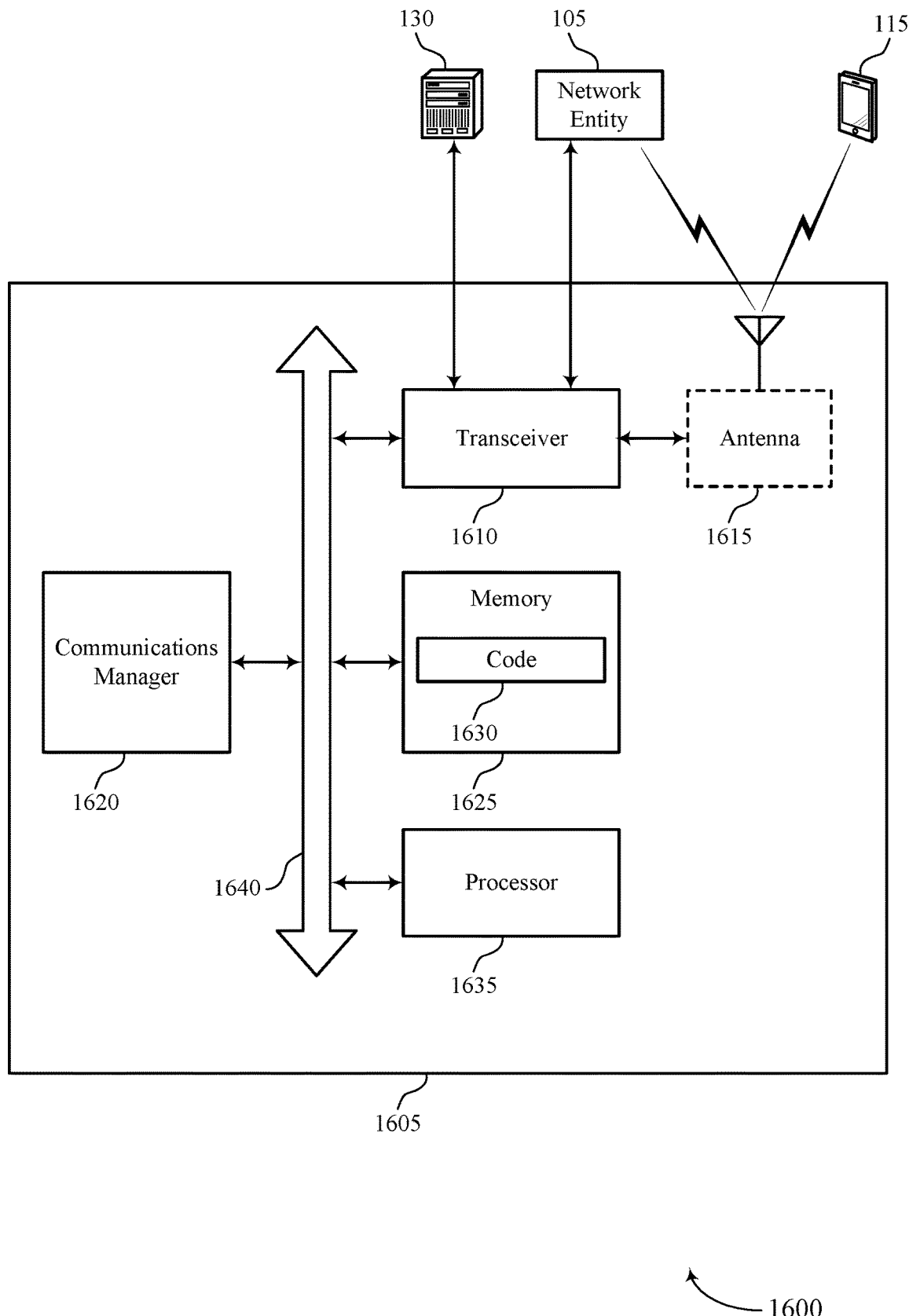
FIG. 16 shows a diagram of a system including a device that supports management of transmission instances for energy harvesting devices in accordance with one or more aspects of the present disclosure.

FIG. 16 shows a diagram of a system 1600 including a device 1605 that supports management of transmission instances for energy harvesting devices in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some aspects, the transceiver 1610 may include a wired transceiver and may communicate bi-directionally with another wired transceiver. Additionally, or alternatively, in some aspects, the transceiver 1610 may include a wireless transceiver and may communicate bi-directionally with another wireless transceiver. In some aspects, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some aspects, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting management of transmission instances for energy harvesting devices). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some aspects, a bus 1640 may support communications of (e.g., within) a protocol layer of a protocol stack. In some aspects, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some aspects, the communications manager 1620 may manage aspects of communications with a core network 130 (e.g., via one or more wired or wireless backhaul links). For example, the communications manager 1620 may manage the transfer of data communications for client devices, such as one or more UEs 115. In some aspects, the communications manager 1620 may manage communications with other network entities 105, and may include a controller or scheduler for controlling communications with UEs 115 in cooperation with other network entities 105. In some aspects, the communications manager 1620 may support an X2 interface within an LTE/LTE-A wireless communications network technology to provide communication between network entities 105.

The communications manager 1620 may support wireless communications at a first network node in accordance with examples as disclosed herein. For example, the communications manager 1620 may be configured as or otherwise support a means for determining a first spatial filter to apply to a first set of transmission instances of a set of multiple transmission instances of a data communication, where the first set of transmission instances is configured to provide the data communication to a second network node. The communications manager 1620 may be configured as or otherwise support a means for determining a second spatial filter to apply to a second set of transmission instances of the set of multiple transmission instances, where the second set of transmission instances is configured to allow harvesting of energy from the data communication by a third network node. The communications manager 1620 may be configured as or otherwise support a means for transmitting the first set of transmission instances using the first spatial filter and the second set of transmission instances using the second spatial filter.

By including or configuring the communications manager 1620 in accordance with examples as described herein, the device 1605 may support techniques for more efficient utilization of communication resources and improved coordination between devices by enabling beam management for transmission instances for energy harvesting purposes.

In some aspects, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some aspects, one or more functions described with reference to the communications manager 1620 may be supported by or performed by the processor 1635, the memory 1625, the code 1630, the transceiver 1610, or any combination thereof.

For example, the code 1630 may include instructions executable by the processor 1635 to cause the device 1605 to perform various aspects of management of transmission instances for energy harvesting devices as described herein, or the processor 1635 and the memory 1625 may be otherwise configured to perform or support such operations.

Figure 17:
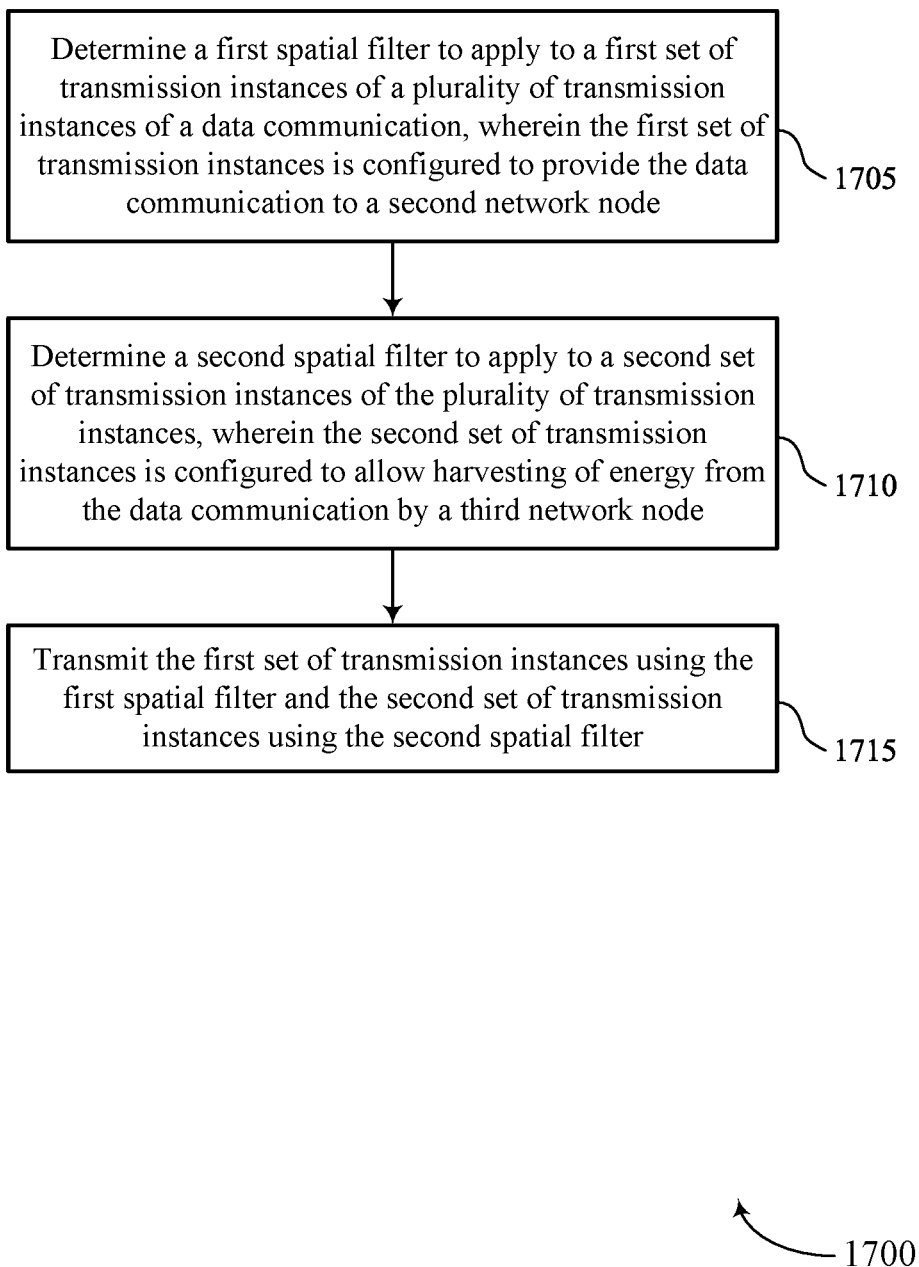
FIGS. 17 through 23 show flowcharts illustrating methods that support management of transmission instances for energy harvesting devices in accordance with one or more aspects of the present disclosure.

FIG. 17 shows a flowchart illustrating a method 1700 that supports management of transmission instances for energy harvesting devices in accordance with one or more aspects of the present disclosure. The operations of the method 1700 may be implemented by a UE or a network entity or its components as described herein. For example, the operations of the method 1700 may be performed by a UE 115 as described with reference to FIGS. 1 through 12 or a network entity as described with reference to FIGS. 1 through 8 and 13 through 16. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include determining a first spatial filter to apply to a first set of transmission instances of a set of multiple transmission instances of a data communication, where the first set of transmission instances is configured to provide the data communication to a second network node. The operations of 1705 may be performed in accordance with examples as disclosed herein. In some examples, aspects of the operations of 1705 may be performed by a data communications transmission manager 1125 or a data communications transmission manager 1525 as described with reference to FIGS. 11 and 15.

At 1710, the method may include determining a second spatial filter to apply to a second set of transmission instances of the set of multiple transmission instances, where the second set of transmission instances is configured to allow harvesting of energy from the data communication by a third network node. The operations of 1710 may be performed in accordance with examples as disclosed herein. In some examples, aspects of the operations of 1710 may be performed by an energy harvesting transmission manager 1130 or an energy harvesting transmission manager 1530 as described with reference to FIGS. 11 and 15.

At 1715, the method may include transmitting the first set of transmission instances using the first spatial filter and the second set of transmission instances using the second spatial filter. The operations of 1715 may be performed in accordance with examples as disclosed herein. In some examples, aspects of the operations of 1715 may be performed by a transmission instance manager 1135 or a transmission instance manager 1535 as described with reference to FIGS. 11 and 15.

Figure 18:
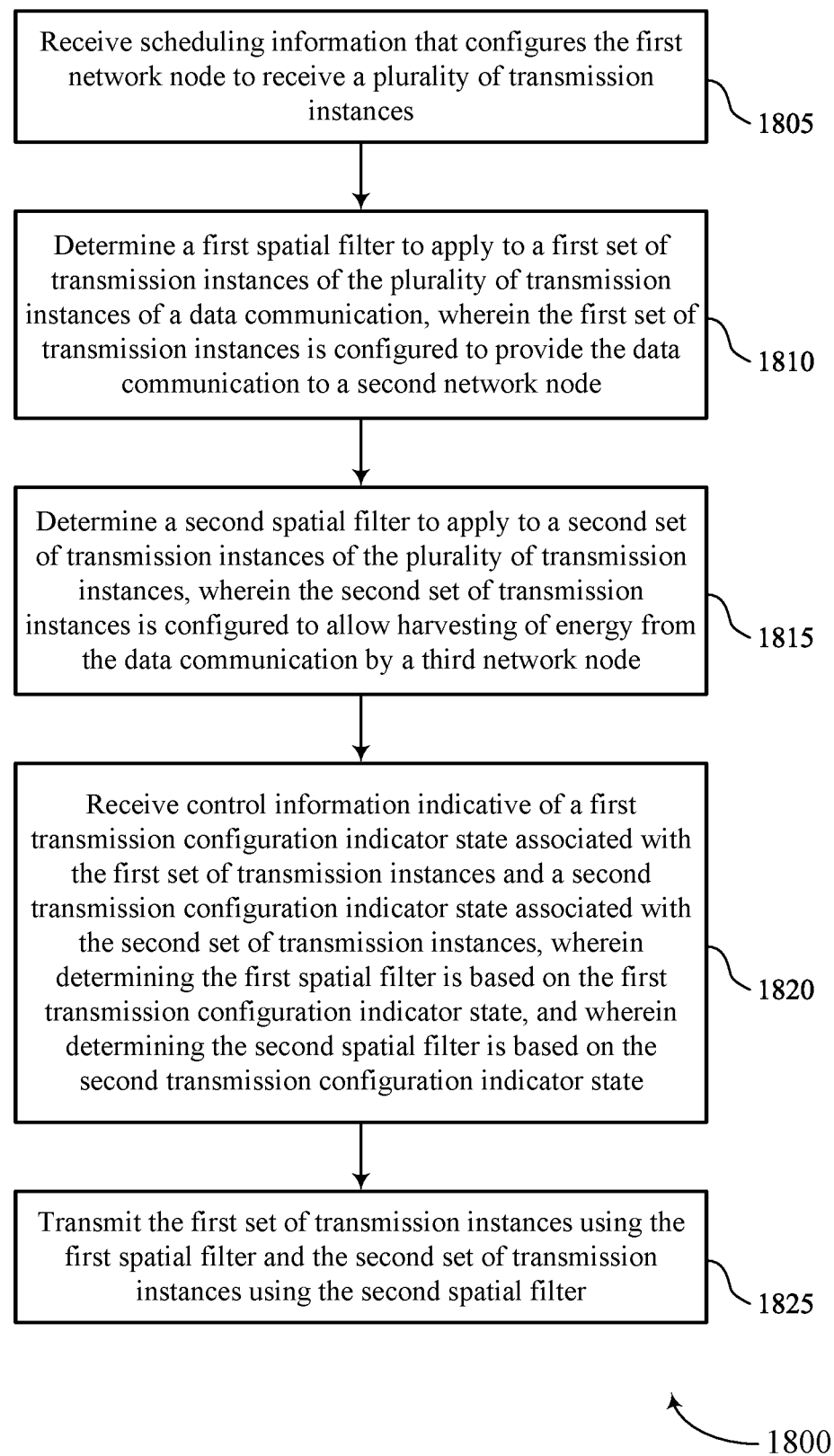

FIG. 18 shows a flowchart illustrating a method 1800 that supports management of transmission instances for energy harvesting devices in accordance with one or more aspects of the present disclosure. The operations of the method 1800 may be implemented by a UE or a network entity or its components as described herein. For example, the operations of the method 1800 may be performed by a UE 115 as described with reference to FIGS. 1 through 12 or a network entity as described with reference to FIGS. 1 through 8 and 13 through 16. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include receiving scheduling information that configures the first network node to receive the set of multiple transmission instances. The operations of 1805 may be performed in accordance with examples as disclosed herein. In some examples, aspects of the operations of 1805 may be performed by a transmission instance scheduling manager 1150 or a transmission instance scheduling manager 1540 as described with reference to FIGS. 11 and 15.

At 1810, the method may include determining a first spatial filter to apply to a first set of transmission instances of a set of multiple transmission instances of a data communication, where the first set of transmission instances is configured to provide the data communication to a second network node. The operations of 1810 may be performed in accordance with examples as disclosed herein. In some examples, aspects of the operations of 1810 may be performed by a data communications transmission manager 1125 or a data communications transmission manager 1525 as described with reference to FIGS. 11 and 15.

At 1815, the method may include determining a second spatial filter to apply to a second set of transmission instances of the set of multiple transmission instances, where the second set of transmission instances is configured to allow harvesting of energy from the data communication by a third network node. The operations of 1815 may be performed in accordance with examples as disclosed herein. In some examples, aspects of the operations of 1815 may be performed by an energy harvesting transmission manager 1130 or an energy harvesting transmission manager 1530 as described with reference to FIGS. 11 and 15.

At 1820, the method may include receiving control information indicative of a first TCI state associated with the first set of transmission instances and a second TCI state associated with the second set of transmission instances, where determining the first spatial filter is based on the first TCI state, and where determining the second spatial filter is based on the second TCI state. The operations of 1820 may be performed in accordance with examples as disclosed herein. In some examples, aspects of the operations of 1820 may be performed by a TCI state manager 1175 or a TCI state manager 1560 as described with reference to FIGS. 11 and 15.

At 1825, the method may include transmitting the first set of transmission instances using the first spatial filter and the second set of transmission instances using the second spatial filter. The operations of 1825 may be performed in accordance with examples as disclosed herein. In some examples, aspects of the operations of 1825 may be performed by a transmission instance manager 1135 or a transmission instance manager 1535 as described with reference to FIGS. 11 and 15.

Figure 19:
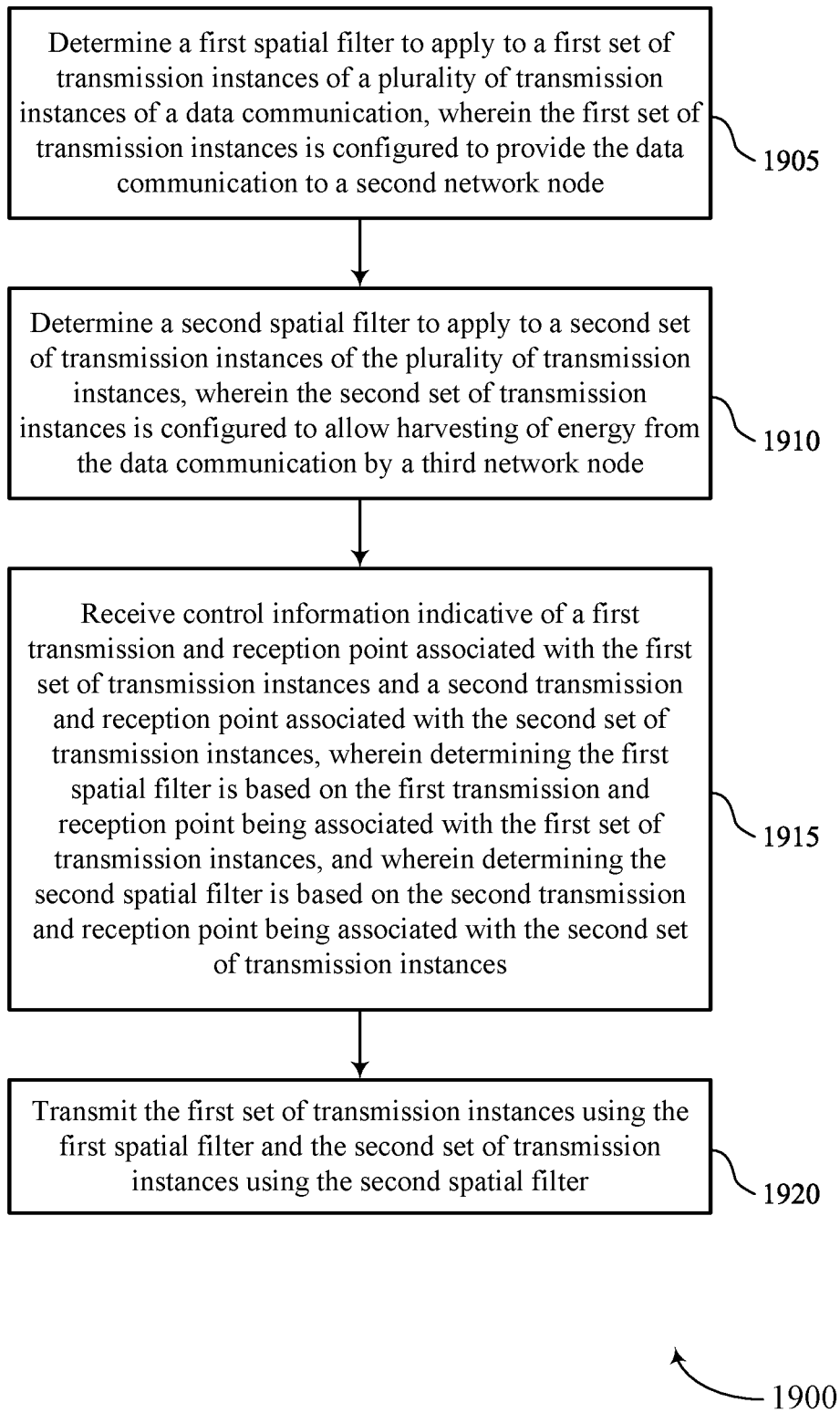

FIG. 19 shows a flowchart illustrating a method 1900 that supports management of transmission instances for energy harvesting devices in accordance with one or more aspects of the present disclosure. The operations of the method 1900 may be implemented by a UE or a network entity or its components as described herein. For example, the operations of the method 1900 may be performed by a UE 115 as described with reference to FIGS. 1 through 12 or a network entity as described with reference to FIGS. 1 through 8 and 13 through 16. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 1905, the method may include determining a first spatial filter to apply to a first set of transmission instances of a set of multiple transmission instances of a data communication, where the first set of transmission instances is configured to provide the data communication to a second network node. The operations of 1905 may be performed in accordance with examples as disclosed herein. In some examples, aspects of the operations of 1905 may be performed by a data communications transmission manager 1125 or a data communications transmission manager 1525 as described with reference to FIGS. 11 and 15.

At 1910, the method may include determining a second spatial filter to apply to a second set of transmission instances of the set of multiple transmission instances, where the second set of transmission instances is configured to allow harvesting of energy from the data communication by a third network node. The operations of 1910 may be performed in accordance with examples as disclosed herein. In some examples, aspects of the operations of 1910 may be performed by an energy harvesting transmission manager 1130 or an energy harvesting transmission manager 1530 as described with reference to FIGS. 11 and 15.

At 1915, the method may include receiving control information indicative of a first TRP associated with the first set of transmission instances and a second TRP associated with the second set of transmission instances, where determining the first spatial filter is based on the first TRP being associated with the first set of transmission instances, and where determining the second spatial filter is based on the second TRP being associated with the second set of transmission instances. The operations of 1915 may be performed in accordance with examples as disclosed herein. In some examples, aspects of the operations of 1915 may be performed by an TRP manager 1155 or an TRP manager 1545 as described with reference to FIGS. 11 and 15.

At 1920, the method may include transmitting the first set of transmission instances using the first spatial filter and the second set of transmission instances using the second spatial filter. The operations of 1920 may be performed in accordance with examples as disclosed herein. In some examples, aspects of the operations of 1920 may be performed by a transmission instance manager 1135 or a transmission instance manager 1535 as described with reference to FIGS. 11 and 15.

Figure 20:
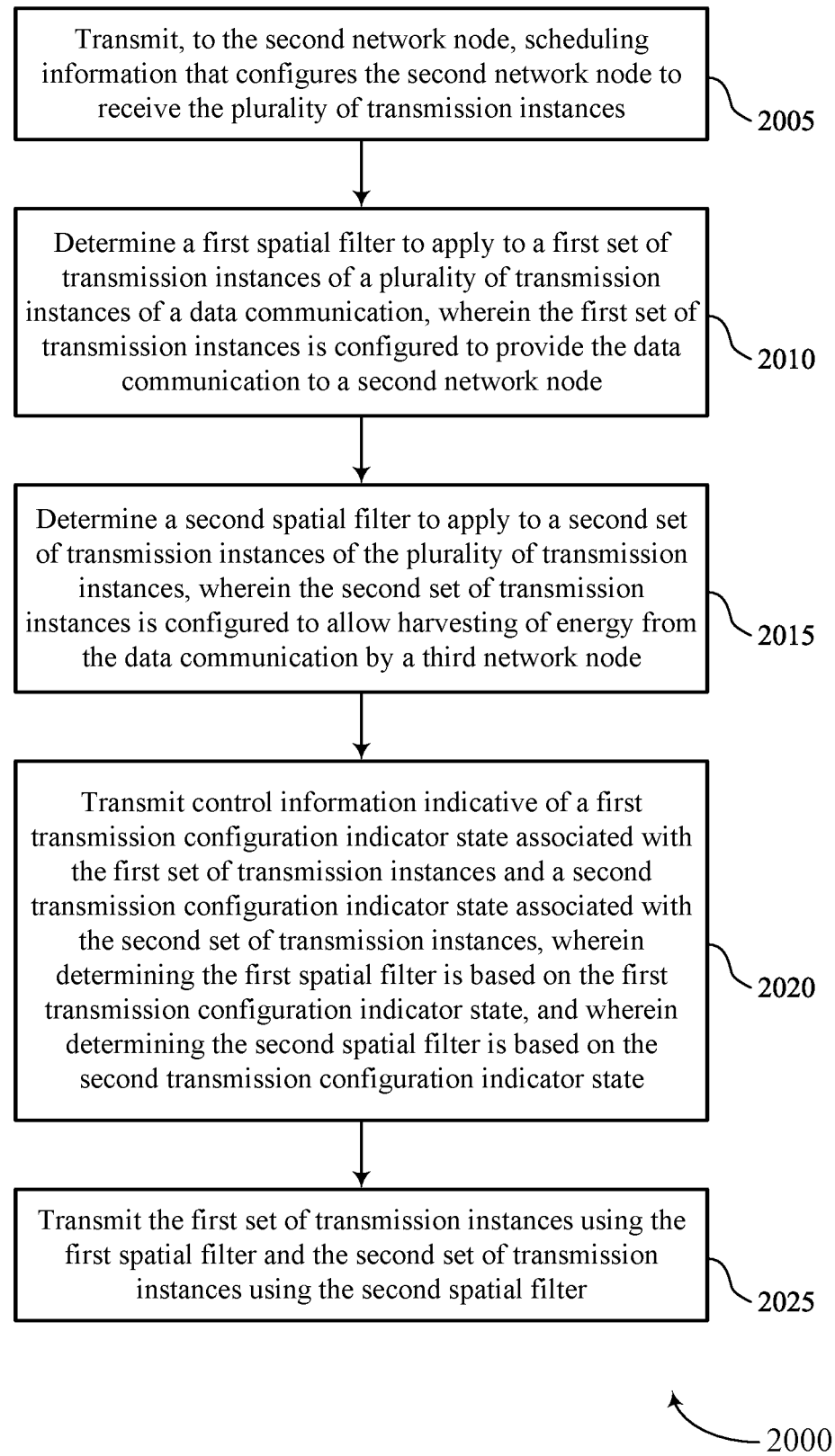

FIG. 20 shows a flowchart illustrating a method 2000 that supports management of transmission instances for energy harvesting devices in accordance with one or more aspects of the present disclosure. The operations of the method 2000 may be implemented by a UE or a network entity or its components as described herein. For example, the operations of the method 2000 may be performed by a UE 115 as described with reference to FIGS. 1 through 12 or a network entity as described with reference to FIGS. 1 through 8 and 13 through 16. In some aspects, a UE or a network entity may execute a set of instructions to control the functional elements of the UE or the network entity to perform the described functions. Additionally, or alternatively, the UE or the network entity may perform aspects of the described functions using special-purpose hardware.

At 2005, the method may include transmitting, to the second network node, scheduling information that configures the second network node to receive the set of multiple transmission instances. The operations of 2005 may be performed in accordance with examples as disclosed herein. In some examples, aspects of the operations of 2005 may be performed by a transmission instance scheduling manager 1150 or a transmission instance scheduling manager 1540 as described with reference to FIGS. 11 and 15.

At 2010, the method may include determining a first spatial filter to apply to a first set of transmission instances of a set of multiple transmission instances of a data communication, where the first set of transmission instances is configured to provide the data communication to a second network node. The operations of 2010 may be performed in accordance with examples as disclosed herein. In some examples, aspects of the operations of 2010 may be performed by a data communications transmission manager 1125 or a data communications transmission manager 1525 as described with reference to FIGS. 11 and 15.

At 2015, the method may include determining a second spatial filter to apply to a second set of transmission instances of the set of multiple transmission instances, where the second set of transmission instances is configured to allow harvesting of energy from the data communication by a third network node. The operations of 2015 may be performed in accordance with examples as disclosed herein. In some examples, aspects of the operations of 2015 may be performed by an energy harvesting transmission manager 1130 or an energy harvesting transmission manager 1530 as described with reference to FIGS. 11 and 15.

At 2020, the method may include transmitting control information indicative of a first TCI state associated with the first set of transmission instances and a second TCI state associated with the second set of transmission instances, where determining the first spatial filter is based on the first TCI state, and where determining the second spatial filter is based on the second TCI state. The operations of 2020 may be performed in accordance with examples as disclosed herein. In some examples, aspects of the operations of 2020 may be performed by a TCI state manager 1175 or a TCI state manager 1560 as described with reference to FIGS. 11 and 15.

At 2025, the method may include transmitting the first set of transmission instances using the first spatial filter and the second set of transmission instances using the second spatial filter. The operations of 2025 may be performed in accordance with examples as disclosed herein. In some examples, aspects of the operations of 2025 may be performed by a transmission instance manager 1135 or a transmission instance manager 1535 as described with reference to FIGS. 11 and 15.

Figure 21:
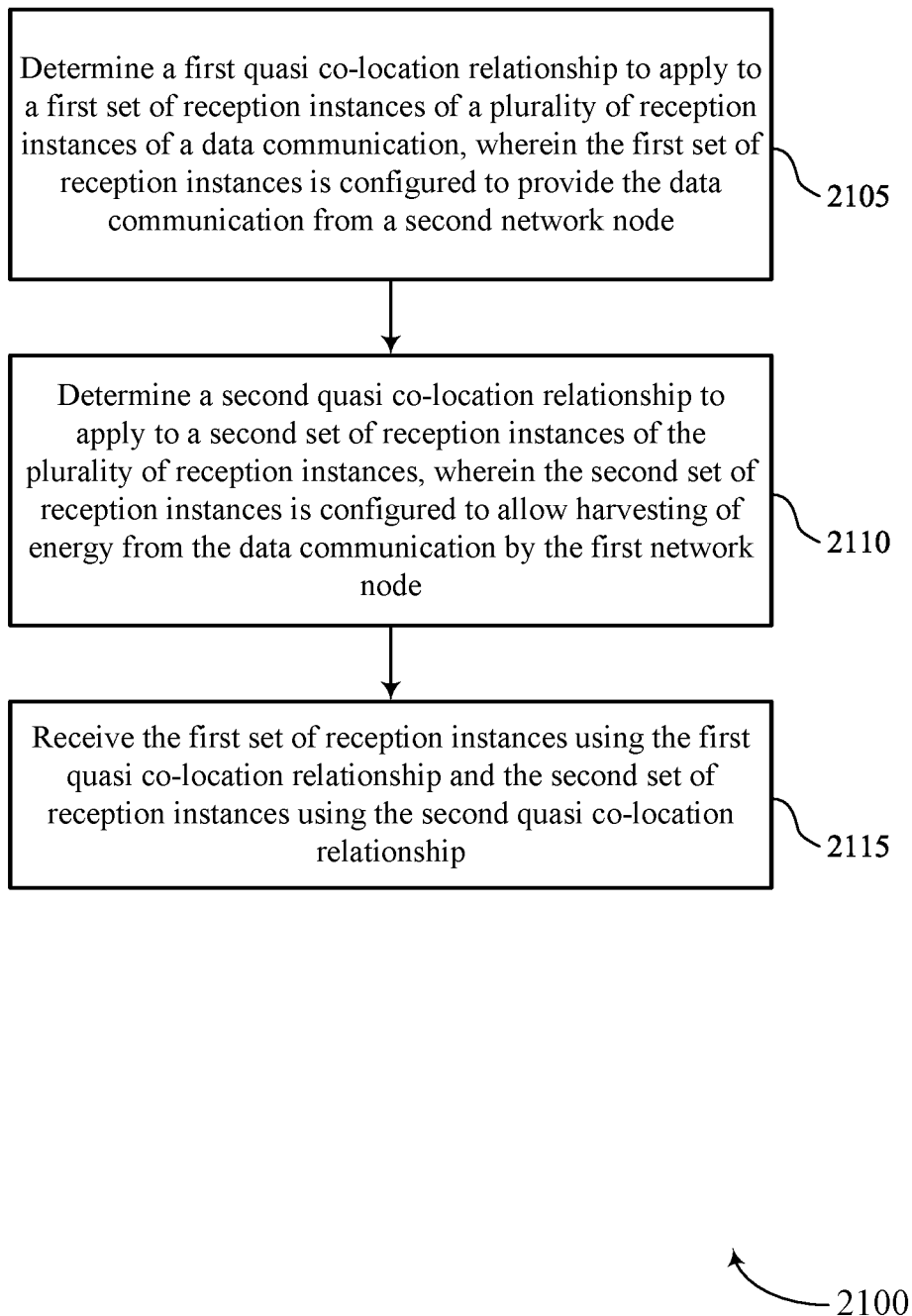

FIG. 21 shows a flowchart illustrating a method 2100 that supports management of transmission instances for energy harvesting devices in accordance with one or more aspects of the present disclosure. The operations of the method 2100 may be implemented by a UE or its components as described herein. For example, the operations of the method 2100 may be performed by a UE 115 as described with reference to FIGS. 1 through 12. In some aspects, a UE may execute a set of instructions to control the functional elements of the UE to perform the described functions. Additionally, or alternatively, the UE may perform aspects of the described functions using special-purpose hardware.

At 2105, the method may include determining a first QCL relationship to apply to a first set of reception instances of a set of multiple reception instances of a data communication, where the first set of reception instances is configured to provide the data communication from a second network node. The operations of 2105 may be performed in accordance with examples as disclosed herein. In some examples, aspects of the operations of 2105 may be performed by a QCL relationship manager 1140 as described with reference to FIG. 11.

At 2110, the method may include determining a second QCL relationship to apply to a second set of reception instances of the set of multiple reception instances, where the second set of reception instances is configured to allow harvesting of energy from the data communication by the first network node. The operations of 2110 may be performed in accordance with examples as disclosed herein. In some examples, aspects of the operations of 2110 may be performed by a QCL relationship manager 1140 as described with reference to FIG. 11.

At 2115, the method may include receiving the first set of reception instances using the first QCL relationship and the second set of reception instances using the second QCL relationship. The operations of 2115 may be performed in accordance with examples as disclosed herein. In some examples, aspects of the operations of 2115 may be performed by a reception instance manager 1145 as described with reference to FIG. 11.

Figure 22:
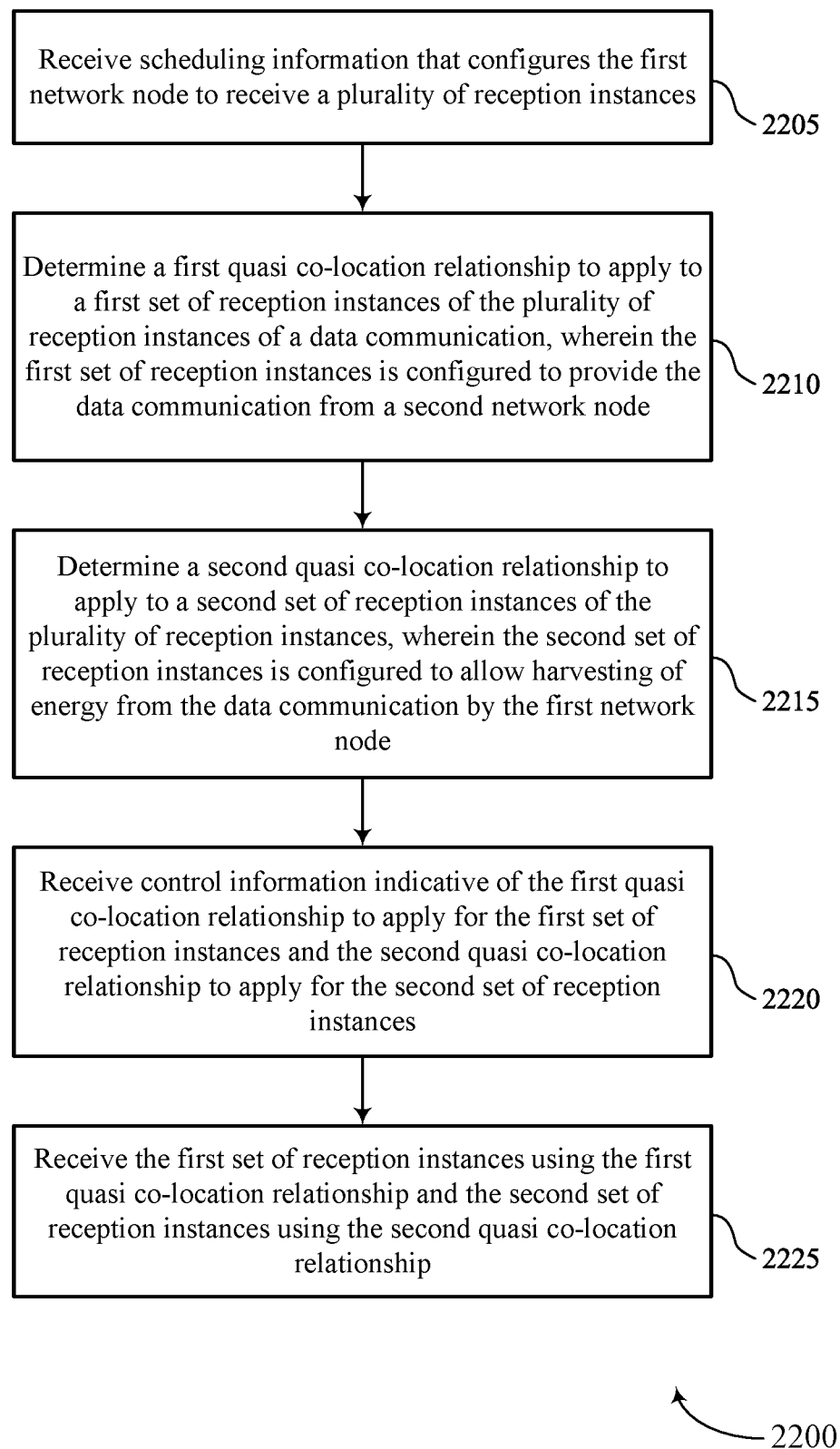

FIG. 22 shows a flowchart illustrating a method 2200 that supports management of transmission instances for energy harvesting devices in accordance with one or more aspects of the present disclosure. The operations of the method 2200 may be implemented by a UE or its components as described herein. For example, the operations of the method 2200 may be performed by a UE 115 as described with reference to FIGS. 1 through 12. In some aspects, a UE may execute a set of instructions to control the functional elements of the UE to perform the described functions. Additionally, or alternatively, the UE may perform aspects of the described functions using special-purpose hardware.

At 2205, the method may include receiving scheduling information that configures the first network node to receive the set of multiple reception instances. The operations of 2205 may be performed in accordance with examples as disclosed herein. In some examples, aspects of the operations of 2205 may be performed by a reception instance scheduling manager 1165 as described with reference to FIG. 11.

At 2210, the method may include determining a first QCL relationship to apply to a first set of reception instances of a set of multiple reception instances of a data communication, where the first set of reception instances is configured to provide the data communication from a second network node. The operations of 2210 may be performed in accordance with examples as disclosed herein. In some examples, aspects of the operations of 2210 may be performed by a QCL relationship manager 1140 as described with reference to FIG. 11.

At 2215, the method may include determining a second QCL relationship to apply to a second set of reception instances of the set of multiple reception instances, where the second set of reception instances is configured to allow harvesting of energy from the data communication by the first network node. The operations of 2215 may be performed in accordance with examples as disclosed herein. In some examples, aspects of the operations of 2215 may be performed by a QCL relationship manager 1140 as described with reference to FIG. 11.

At 2220, the method may include receiving control information indicative of the first QCL relationship to apply for the first set of reception instances and the second QCL relationship to apply for the second set of reception instances. The operations of 2220 may be performed in accordance with examples as disclosed herein. In some examples, aspects of the operations of 2220 may be performed by a QCL relationship manager 1140 as described with reference to FIG. 11.

At 2225, the method may include receiving the first set of reception instances using the first QCL relationship and the second set of reception instances using the second QCL relationship. The operations of 2225 may be performed in accordance with examples as disclosed herein. In some examples, aspects of the operations of 2225 may be performed by a reception instance manager 1145 as described with reference to FIG. 11.

Figure 23:
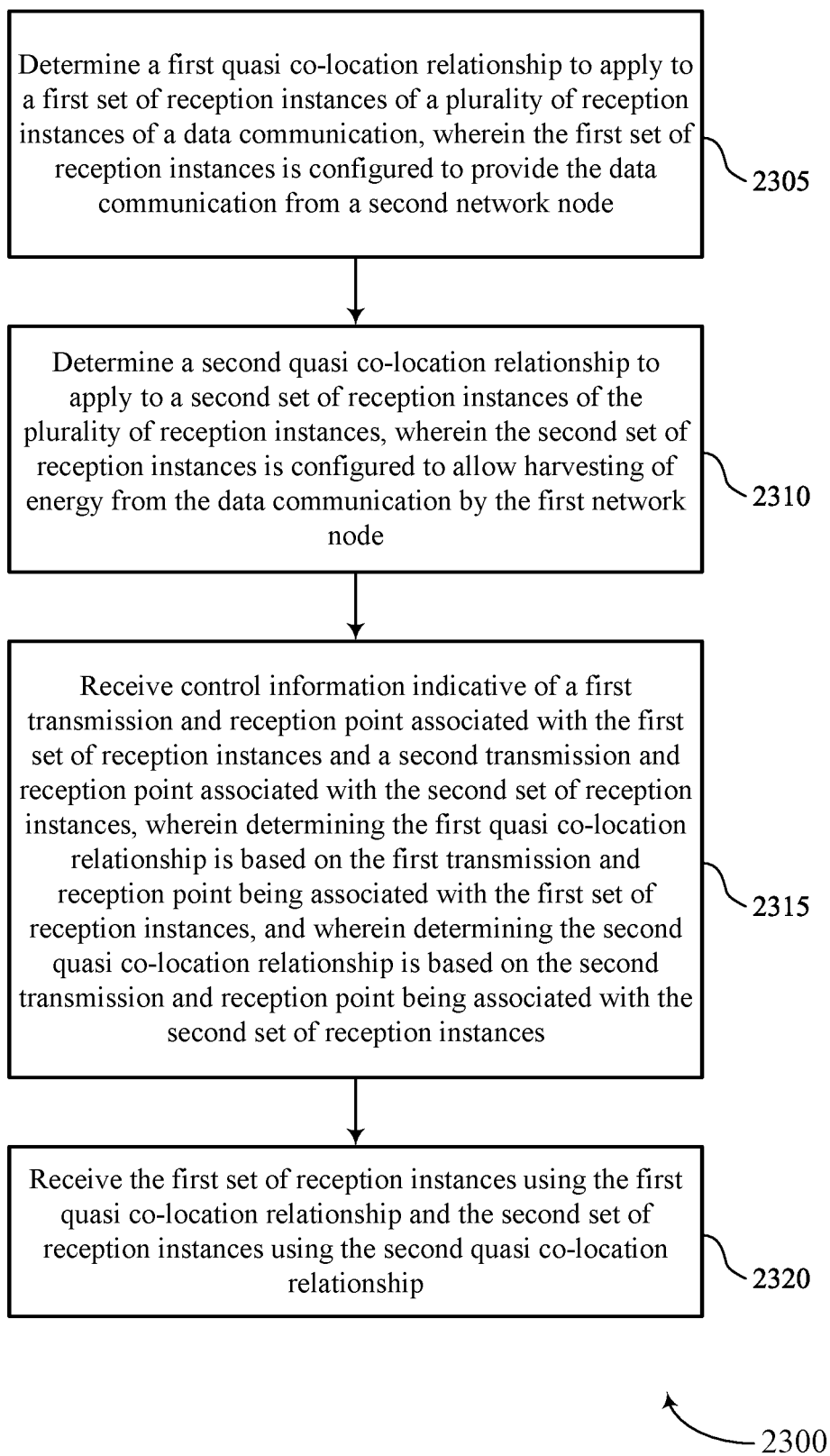

FIG. 23 shows a flowchart illustrating a method 2300 that supports management of transmission instances for energy harvesting devices in accordance with one or more aspects of the present disclosure. The operations of the method 2300 may be implemented by a UE or its components as described herein. For example, the operations of the method 2300 may be performed by a UE 115 as described with reference to FIGS. 1 through 12. In some aspects, a UE may execute a set of instructions to control the functional elements of the UE to perform the described functions. Additionally, or alternatively, the UE may perform aspects of the described functions using special-purpose hardware.

At 2305, the method may include determining a first QCL relationship to apply to a first set of reception instances of a set of multiple reception instances of a data communication, where the first set of reception instances is configured to provide the data communication from a second network node. The operations of 2305 may be performed in accordance with examples as disclosed herein. In some examples, aspects of the operations of 2305 may be performed by a QCL relationship manager 1140 as described with reference to FIG. 11.

At 2310, the method may include determining a second QCL relationship to apply to a second set of reception instances of the set of multiple reception instances, where the second set of reception instances is configured to allow harvesting of energy from the data communication by the first network node. The operations of 2310 may be performed in accordance with examples as disclosed herein. In some examples, aspects of the operations of 2310 may be performed by a QCL relationship manager 1140 as described with reference to FIG. 11.

At 2315, the method may include receiving control information indicative of a first TRP associated with the first set of reception instances and a second TRP associated with the second set of reception instances, where determining the first QCL relationship is based on the first TRP being associated with the first set of reception instances, and where determining the second QCL relationship is based on the second TRP being associated with the second set of reception instances. The operations of 2315 may be performed in accordance with examples as disclosed herein. In some examples, aspects of the operations of 2315 may be performed by an TRP manager 1155 as described with reference to FIG. 11.

At 2320, the method may include receiving the first set of reception instances using the first QCL relationship and the second set of reception instances using the second QCL relationship. The operations of 2320 may be performed in accordance with examples as disclosed herein. In some examples, aspects of the operations of 2320 may be performed by a reception instance manager 1145 as described with reference to FIG. 11.

The following provides an overview of aspects of the present disclosure:

Aspect 1: A method for wireless communications at a first network node, comprising: determining a first spatial filter to apply to a first set of transmission instances of a plurality of transmission instances of a data communication, wherein the first set of transmission instances is configured to provide the data communication to a second network node; determining a second spatial filter to apply to a second set of transmission instances of the plurality of transmission instances, wherein the second set of transmission instances is configured to allow harvesting of energy from the data communication by a third network node; and transmitting the first set of transmission instances using the first spatial filter and the second set of transmission instances using the second spatial filter.

Aspect 2: The method of aspect 1, further comprising: receiving scheduling information that configures the first network node to receive the plurality of transmission instances.

Aspect 3: The method of aspect 2, further comprising: receiving control information indicative of a first TCI state associated with the first set of transmission instances and a second TCI state associated with the second set of transmission instances, wherein determining the first spatial filter is based on the first TCI state, and wherein determining the second spatial filter is based on the second TCI state.

Aspect 4: The method of aspect 3, further comprising: transmitting second control information indicative of a QCL relationship for energy harvesting at the first network node, wherein the second TCI state is based on the second control information.

Aspect 5: The method of aspect 4, further comprising: receiving one or more reference signals from the second network node; and identifying the QCL relationship for harvesting of energy at the first network node based on measurement information corresponding to the one or more reference signals, wherein the third network node is the first network node.

Aspect 6: The method of aspect 5, wherein the measurement information includes charging rate information for harvesting of energy associated with the one or more reference signals.

Aspect 7: The method of any of aspects 3 through 6, further comprising: receiving one or more reference signals from the second network node; and transmitting second control information to the second network node indicating measurement information for the one or more reference signals, wherein the second TCI state is based on the measurement information.

Aspect 8: The method of aspect 7, wherein the measurement information includes, for the one or more reference signals, at least one of a signal to interference and noise ratio, a reference signal received power, a reference signal received quality, or charging rate information that pertains to harvesting of energy.

Aspect 9: The method of aspect 8, wherein the charging rate information that pertains to harvesting of energy comprises a one bit or multi-bit indicator of charging rate sufficiency based on one or more thresholds.

Aspect 10: The method of any of aspects 3 through 9, wherein the plurality of transmission instances comprise a plurality of uplink transmission repetitions.

Aspect 11: The method of any of aspects 1 through 10, further comprising: receiving control information indicative of a first TRP associated with the first set of transmission instances and a second TRP associated with the second set of transmission instances, wherein determining the first spatial filter is based on the first TRP being associated with the first set of transmission instances, and wherein determining the second spatial filter is based on the second TRP being associated with the second set of transmission instances.

Aspect 12: The method of aspect 11, wherein the second set of transmission instances comprises a different number of transmission instances than the first set of transmission instances.

Aspect 13: The method of any of aspects 11 through 12, further comprising: receiving one or more first reference signals from the first TRP; receiving one or more second reference signals from the second TRP; and transmitting second control information to the second network node indicating measurement information for the one or more first reference signals and the one or more second reference signals, wherein the control information is based on the measurement information.

Aspect 14: The method of any of aspects 1 through 13, further comprising: transmitting, to the second network node, scheduling information that configures the second network node to receive the plurality of transmission instances.

Aspect 15: The method of aspect 14, further comprising: transmitting control information indicative of a first TCI state associated with the first set of transmission instances and a second TCI state associated with the second set of transmission instances, wherein determining the first spatial filter is based on the first TCI state, and wherein determining the second spatial filter is based on the second TCI state.

Aspect 16: The method of aspect 15, further comprising: transmitting, to the second network node, one or more reference signals; and receiving, from the second network node, measurement information for the one or more reference signals, wherein the second TCI state is based on the measurement information.

Aspect 17: The method of any of aspects 15 through 16, wherein the plurality of transmission instances is a plurality of sidelink transmission instances.

Aspect 18: The method of any of aspects 15 through 17, wherein the plurality of transmission instances is a plurality of downlink transmission instances.

Aspect 19: The method of any of aspects 14 through 18, further comprising: transmitting the first set of transmission instances using a first power level; and transmitting the second set of transmission instances using a second power level different than the first power level.

Aspect 20: The method of any of aspects 1 through 19, further comprising: transmitting, to the second network node, first control information indicative of a first QCL relationship associated with the first spatial filter; and transmitting, to the third network node, second control information indicative of a second QCL relationship associated with the second spatial filter.

Aspect 21: The method of any of aspects 1 through 20, further comprising: harvesting energy from the second set of transmission instances, wherein the third network node is the first network node.

Aspect 22: A method for wireless communications at a first network node, comprising: determining a first QCL relationship to apply to a first set of reception instances of a plurality of reception instances of a data communication, wherein the first set of reception instances is configured to provide the data communication from a second network node; determining a second QCL relationship to apply to a second set of reception instances of the plurality of reception instances, wherein the second set of reception instances is configured to allow harvesting of energy from the data communication by the first network node; and receiving the first set of reception instances using the first QCL relationship and the second set of reception instances using the second QCL relationship.

Aspect 23: The method of aspect 22, further comprising: receiving scheduling information that configures the first network node to receive the plurality of reception instances.

Aspect 24: The method of aspect 23, further comprising: receiving control information indicative of the first QCL relationship to apply for the first set of reception instances and the second QCL relationship to apply for the second set of reception instances.

Aspect 25: The method of any of aspects 22 through 24, further comprising: receiving one or more reference signals from the second network node; and transmitting second control information to the second network node indicating measurement information for the one or more reference signals, wherein the second QCL relationship is based on the measurement information.

Aspect 26: The method of any of aspects 22 through 25, further comprising: receiving control information indicative of a first TRP associated with the first set of reception instances and a second TRP associated with the second set of reception instances, wherein determining the first QCL relationship is based on the first TRP being associated with the first set of reception instances, and wherein determining the second QCL relationship is based on the second TRP being associated with the second set of reception instances.

Aspect 27: The method of aspect 26, further comprising: receiving one or more first reference signals from the first TRP; receiving one or more second reference signals from the second TRP; and transmitting second control information to the second network node indicating measurement information for the one or more first reference signals and the one or more second reference signals, wherein the control information is based on the measurement information.

Aspect 28: The method of any of aspects 22 through 27, wherein the plurality of reception instances is a plurality of downlink reception instances.

Aspect 29: The method of any of aspects 22 through 28, wherein the plurality of reception instances is a plurality of sidelink reception instances.

Aspect 30: The method of any of aspects 22 through 29, further comprising: harvesting energy from the second set of reception instances.

Aspect 31: The method of aspect 30, further comprising: receiving the data communication via the first set of reception instances and the second set of reception instances.

Aspect 32: An apparatus for wireless communications at a first network node, comprising a memory; and at least on processor coupled to the memory, wherein the at least one processor is configured to perform a method of any of aspects 1 through 21.

Aspect 33: An apparatus for wireless communications at a first network node, comprising at least one means for performing a method of any of aspects 1 through 21.

Aspect 34: A non-transitory computer-readable medium storing code for wireless communications at a first network node, the code comprising instructions executable by a processor to perform a method of any of aspects 1 through 21.

Aspect 35: An apparatus for wireless communications at a first network node, comprising a memory; and at least on processor coupled to the memory, wherein the at least one processor is configured to perform a method of any of aspects 22 through 31.

Aspect 36: An apparatus for wireless communications at a first network node, comprising at least one means for performing a method of any of aspects 22 through 31.

Aspect 37: A non-transitory computer-readable medium storing code for wireless communications at a first network node, the code comprising instructions executable by a processor to perform a method of any of aspects 22 through 31.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    a memory; and
    at least one processor coupled to the memory, wherein the at least one processor is configured to:
        determine a first spatial filter to apply to a first set of transmission instances of a plurality of transmission instances of a data communication, wherein the first set of transmission instances is configured to provide the data communication to a second network node;
        determine a second spatial filter to apply to a second set of transmission instances of the plurality of transmission instances, wherein the second set of transmission instances is configured to allow harvesting of energy from the data communication by a third network node; and
        transmit the first set of transmission instances using the first spatial filter and the second set of transmission instances using the second spatial filter.

2. The first network node of claim 1, wherein the at least one processor is further configured to:
    receive scheduling information that configures the first network node to receive the plurality of transmission instances.

3. The first network node of claim 2, wherein the at least one processor is further configured to:
    receive, control information indicative of a first transmission configuration indicator state associated with the first set of transmission instances and a second transmission configuration indicator state associated with the second set of transmission instances, wherein:
        to determine the first spatial filter, the at least one processor is configured to determine the first spatial filter based on the first transmission configuration indicator state; and
        to determine the second spatial filter, the at least one processor is configured to determine the second spatial filter based on the second transmission configuration indicator state.

4. The first network node of claim 3, wherein the at least one processor is further configured to:
transmit second control information indicative of a quasi co-location relationship for energy harvesting at the first network node, wherein the second transmission configuration indicator state is based on the second control information.

5. The first network node of claim 4, wherein the at least one processor is further configured to:
receive one or more reference signals from the second network node; and
identify the quasi co-location relationship for harvesting of energy at the first network node based on measurement information corresponding to the one or more reference signals, wherein the third network node is the first network node.

6. The first network node of claim 5, wherein the measurement information includes charging rate information for harvesting of energy associated with the one or more reference signals.

7. The first network node of claim 3, wherein the at least one processor is further configured to:
receive one or more reference signals from the second network node; and
transmit second control information to the second network node indicating measurement information for the one or more reference signals, wherein the second transmission configuration indicator state is based on the measurement information.

8. The first network node of claim 7, wherein the measurement information includes, for the one or more reference signals, at least one of a signal to interference and noise ratio, a reference signal received power, a reference signal received quality, or charging rate information that pertains to harvesting of energy.

9. The first network node of claim 8, wherein the charging rate information that pertains to harvesting of energy comprises a one bit or multi-bit indicator of charging rate sufficiency based on one or more thresholds.

10. The first network node of claim 3, wherein the plurality of transmission instances comprise a plurality of uplink transmission repetitions.

11. The first network node of claim 1, wherein the at least one processor is further configured to:
receive control information indicative of a first transmission and reception point associated with the first set of transmission instances and a second transmission and reception point associated with the second set of transmission instances, wherein:
to determine the first spatial filter, the at least one processor is configured to determine the first spatial filter based on the first transmission and reception point being associated with the first set of transmission instances; and
to determine the second spatial filter, the at least one processor is configured to determine the second spatial filter based on the second transmission and reception point being associated with the second set of transmission instances.

12. The first network node of claim 11, wherein the second set of transmission instances comprises a different number of transmission instances than the first set of transmission instances.

13. The first network node of claim 11, wherein the at least one processor is further configured to:
receive one or more first reference signals from the first transmission and reception point;
receive one or more second reference signals from the second transmission and reception point; and
transmit second control information to the second network node indicating measurement information for the one or more first reference signals and one or more second reference signals, wherein the control information is based on the measurement information.

14. The first network node of claim 1, wherein the at least one processor is further configured to:
transmit, to the second network node, scheduling information that configures the second network node to receive the plurality of transmission instances.

15. The first network node of claim 14, wherein the at least one processor is further configured to:
transmit control information indicative of a first transmission configuration indicator state associated with the first set of transmission instances and a second transmission configuration indicator state associated with the second set of transmission instances, wherein:
to determine the first spatial filter, the at least one processor is configured to determine the first spatial filter based on the first transmission configuration indicator state; and
to determine the second spatial filter, the at least one processor is configured to determine the second spatial filter based on the second transmission configuration indicator state.

16. The first network node of claim 15, wherein the at least one processor is further configured to:
transmit, to the second network node, one or more reference signals; and
receive, from the second network node, measurement information for the one or more reference signals, wherein the second transmission configuration indicator state is based on the measurement information.

17. The first network node of claim 15, wherein the plurality of transmission instances is a plurality of sidelink transmission instances.

18. The first network node of claim 15, wherein the plurality of transmission instances is a plurality of downlink transmission instances.

19. The first network node of claim 14, wherein the at least one processor is further configured to:
transmit the first set of transmission instances using a first power level; and
transmit the second set of transmission instances using a second power level different than the first power level.

20. The first network node of claim 1, wherein the at least one processor is further configured to:
transmit, to the second network node, first control information indicative of a first quasi co-location relationship associated with the first spatial filter; and
transmit, to the third network node, second control information indicative of a second quasi co-location relationship associated with the second spatial filter.

21. The first network node of claim 1, wherein the at least one processor is further configured to:
harvest energy from the second set of transmission instances, wherein the third network node is the first network node.

22. A first network node for wireless communication, comprising:
a memory; and
at least one processor coupled to the memory, wherein the at least one processor is configured to:
determine a first quasi co-location relationship to apply to a first set of reception instances of a plurality of reception instances of a data communication, wherein the first set of reception instances is configured to provide the data communication from a second network node;

determine a second quasi co-location relationship to apply to a second set of reception instances of the plurality of reception instances, wherein the second set of reception instances is configured to allow harvesting of energy from the data communication by the first network node; and receive the first set of reception instances using the first quasi co-location relationship and the second set of reception instances using the second quasi co-location relationship.

23. The first network node of claim 22, wherein the at least one processor is further configured to:

receive scheduling information that configures the first network node to receive the plurality of reception instances.

24. The first network node of claim 23, wherein the at least one processor is further configured to:

receive control information indicative of the first quasi co-location relationship to apply for the first set of reception instances and the second quasi co-location relationship to apply for the second set of reception instances.

25. The first network node of claim 22, wherein the at least one processor is further configured to:

receive one or more reference signals from the second network node; and transmit second control information to the second network node indicating measurement information for the one or more reference signals, wherein the second quasi co-location relationship is based on the measurement information.

26. The first network node of claim 22, wherein the at least one processor is further configured to:

receive control information indicative of a first transmission and reception point associated with the first set of reception instances and a second transmission and reception point associated with the second set of reception instances, wherein:

to determine the first quasi co-location relationship, the at least one processor is configured to determine the first quasi co-location relationship based on the first transmission and reception point being associated with the first set of reception instances; and to determine the second quasi co-location relationship, the at least one processor is configured to determine the second quasi co-location relationship based on the second transmission and reception point being associated with the second set of reception instances.

27. The first network node of claim 26, wherein the at least one processor is further configured to:

receive one or more first reference signals from the first transmission and reception point;

receive one or more second reference signals from the second transmission and reception point; and transmit second control information to the second network node indicating measurement information for the one or more first reference signals and the one or more second reference signals, wherein the control information is based on the measurement information.

28. The first network node of claim 22, wherein the plurality of reception instances is a plurality of downlink reception instances.

29. A method for wireless communications at a first network node, comprising:

determining a first spatial filter to apply to a first set of transmission instances of a plurality of transmission instances of a data communication, wherein the first set of transmission instances is configured to provide the data communication to a second network node;

determining a second spatial filter to apply to a second set of transmission instances of the plurality of transmission instances, wherein the second set of transmission instances is configured to allow harvesting of energy from the data communication by a third network node; and transmitting the first set of transmission instances using the first spatial filter and the second set of transmission instances using the second spatial filter.

30. A method for wireless communications at a first network node, comprising:

determining a first quasi co-location relationship to apply to a first set of reception instances of a plurality of reception instances of a data communication, wherein the first set of reception instances is configured to provide the data communication from a second network node;

determining a second quasi co-location relationship to apply to a second set of reception instances of the plurality of reception instances, wherein the second set of reception instances is configured to allow harvesting of energy from the data communication by the first network node; and receiving the first set of reception instances using the first quasi co-location relationship and the second set of reception instances using the second quasi co-location relationship.

* * * * *